US011734717B2

(12) United States Patent
Ramesh et al.

(10) Patent No.: US 11,734,717 B2
(45) Date of Patent: Aug. 22, 2023

(54) DYNAMIC PREDICTIVE SIMILARITY GROUPING BASED ON VECTORIZATION OF MERCHANT DATA

(71) Applicant: DoorDash, Inc., San Francisco, CA (US)

(72) Inventors: Raghav Ramesh, South San Francisco, CA (US); Aamir Manasawala, Berkeley, CA (US); Mitchell Hunter Koch, San Francisco, CA (US)

(73) Assignee: SoorDash, Inc., San Francisco, CA (US)

( * ) Notice: Subject to any disclaimer, the term of this patent is extended or adjusted under 35 U.S.C. 154(b) by 0 days.

(21) Appl. No.: 17/934,376

(22) Filed: Sep. 22, 2022

(65) Prior Publication Data

US 2023/0023201 A1 Jan. 26, 2023

Related U.S. Application Data

(63) Continuation of application No. 15/936,219, filed on Mar. 26, 2018.

(51) Int. Cl.
*G06Q 30/06* (2023.01)
*G06Q 30/0251* (2023.01)
*G06N 3/08* (2023.01)

(52) U.S. Cl.
CPC ........... *G06Q 30/0255* (2013.01); *G06N 3/08* (2013.01)

(58) Field of Classification Search
CPC ....... G06Q 30/06; G06Q 30/0255; G06N 3/08
See application file for complete search history.

(56) References Cited

U.S. PATENT DOCUMENTS 7,113,917 B2  9/2006 Jacobi et al.
2004/0225509 A1  11/2004 Andre
(Continued)

FOREIGN PATENT DOCUMENTS

WO  2019190924 A1  10/2019

OTHER PUBLICATIONS

PR Newswire. "Cobrain secures $3M in seed funding to develop first-ever cross-merchant personalization engine". (Mar. 18, 2014). (https://dialog.proquest.com/professional/docview/1508120459?accountid=131444).*

(Continued)

*Primary Examiner* — Jeffrey A. Smith
*Assistant Examiner* — Jennifer V Lee
(74) *Attorney, Agent, or Firm* — Kwan & Olynick LLP

(57) ABSTRACT

Provided are various mechanisms and processes for generating dynamic merchant similarity predictions. In one aspect, a system is configured for receiving historical datasets that include a series of merchants from historical browsing sessions generated by one or more users. The merchants are converted into corresponding vector representations for training a predictive model to output associated merchants based on a generated weighted vector space. Once sufficiently trained, data from a new browsing session may be received, which may include a target merchant. The target merchant is input into the predictive model as a vector to output one or more context merchants having vectors with the highest cosine similarity value to the target merchant vector. Selected context merchants may then be transmitted to the user device as targeted merchant suggestions in the new browsing session. The predictive models may be continuously trained using data received from subsequent browsing sessions.

20 Claims, 13 Drawing Sheets

(56) References Cited

U.S. PATENT DOCUMENTS

| | | | | |
|---|---|---|---|---|
| 2007/0244741 | A1* | 10/2007 | Blume | G06Q 30/0269 705/7.31 |
| 2009/0307049 | A1* | 12/2009 | Elliott, Jr | G06Q 40/00 705/7.29 |
| 2013/0013091 | A1 | 1/2013 | Cavalcanti et al. | |
| 2016/0275553 | A1* | 9/2016 | Gupta | G06Q 30/0201 |
| 2019/0295124 | A1 | 9/2019 | Ramesh et al. | |

OTHER PUBLICATIONS

U.S. Appl. No. 15/936,219, Non-Final Rejection, dated Oct. 30, 2020, 13 pgs.

U.S. Appl. No. 15/936,219, Examiner Interview Summary dated Feb. 12, 2021, 2 pgs.

U.S. Appl. No. 15/936,219, Final Office Action dated Jun. 16, 2021, 14 pgs.

U.S. Appl. No. 15/936,219, Non-Final Office Action dated Dec. 27, 2021, 17 pgs.

Guthrie, D, et al., A Closer Look at Skip-Gram Modelling, Proceedings of the Fifth International Conference on Language Resources and Evaluation, 1222-1225 pgs.

International Application Serial No. PCT/US19/23632, Preliminary Report on Patentability mailed 10/8/0209 pgs.

Int'l Application Serial No. PCT/US19/23632, Int'l Search Report and Written Opinion dated Jul. 8, 2019, 13pgs.

Mikolov, Tomas, et al., Distributed Representations of Phrases and Their Compositionality, Advances on Neural Information Processing Systems.

PR Newswire, "Cobrain secures $3M in seed funding to develop first-ever cross-merchant personalization engine: Rob McGovern, founder of CareerBuilder.com, leads startup focused on providing revolutionary personalization to help consumers truly 'love what they buy'". (Mar. 18, 2014).

Technological Disruption and Innovation in Last Mile Delivery, GSB.Stanford.Edu/R/VCII, Jun. 2016, 26 pgs.

The Difference Between Product Search Engines and Product Recommendation Engines, https://www.loop54.com/knowledge-base/product-search-engines-product-recommendation-engines-differences.

* cited by examiner

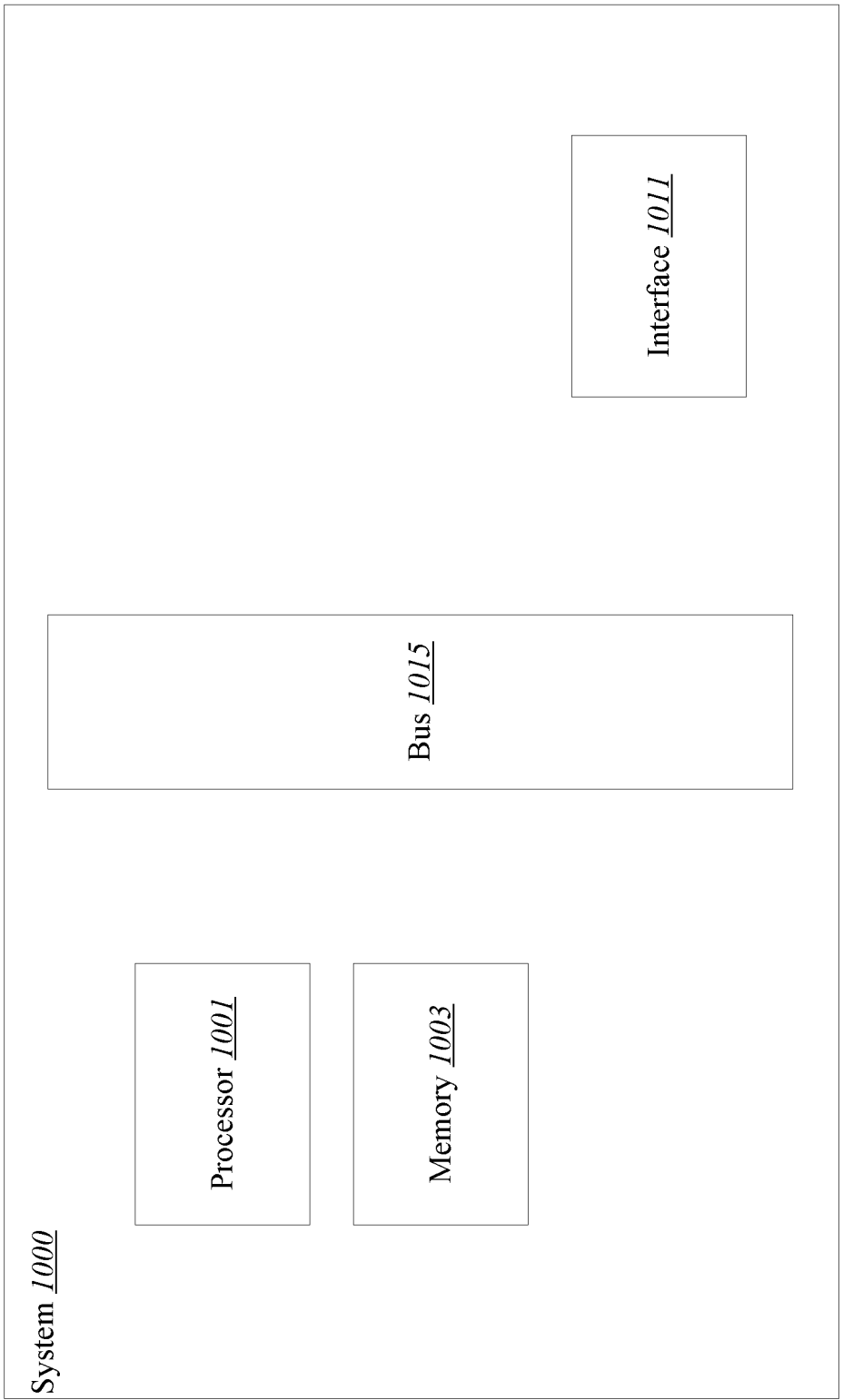

DYNAMIC PREDICTIVE SIMILARITY GROUPING BASED ON VECTORIZATION OF MERCHANT DATA

CROSS-REFERENCE TO RELATED APPLICATIONS

This application is a continuation of U.S. patent application Ser. No. 15/936,219 entitled: "DYNAMIC PREDICTIVE SIMILARITY GROUPING BASED ON VECTORIZATION OF MERCHANT DATA" filed on Mar. 26, 2018, which is incorporated herein by reference in its entirety for all purposes.

TECHNICAL FIELD

The present disclosure relates to a system for facilitating a real-time, on-demand deliveries of perishable goods. In one example, the present disclosure relates to mechanisms and processes for providing predictive groupings of merchants that provide perishable goods.

BACKGROUND

Identifying and understanding latent user preferences is critical to providing personalized experiences to users in online consumer products. In the context of delivery platform, particularly for real-time on-demand deliveries of perishable goods, this involves identifying similarity between stores, and relatedness of a store and a consumer.

Current systems and techniques to identify similar stores include limitations. For example, similar stores may be identified by category, such as cuisine type, which requires explicit coding. Similar stores may also be identified by the purchase history of consumers, which considers only data corresponding to purchases made. Such techniques are not able to leverage implicit data corresponding to underlying user preferences.

Consequently, it is desirable to provide improved mechanisms for providing consumers with meaningful and targeted options in a delivery platform for real-time on-demand delivery of perishable goods.

SUMMARY

Provided are various mechanisms and processes for generating dynamic similarity groupings of merchants and items. Various embodiments are described for generating dynamic merchant similarity predictions to be provided as recommendations to one or more customers. In one aspect, which may include at least a portion of the subject matter of any of the preceding and/or following examples and aspects, a server is configured to generate such dynamic merchant similarity predictions.

The server comprises an interface configured to receive a plurality of historical datasets including a plurality of merchants corresponding to historical browsing sessions generated by one or more users, and a new dataset corresponding to a new browsing session generated by a first user. The new dataset includes a first merchant of the plurality of merchants. The server further comprises memory configured to store the historical datasets and the new dataset.

The server further comprises a processor associated with a neural network. The processor is configured for converting each merchant in the historical datasets into a corresponding vector representation. The processor is further configured for inputting each corresponding vector representation into the neural network to generate weights corresponding to dimensions of the vector representations.

The processor may be configured to convert the first merchant in the new dataset into a corresponding first merchant vector, and input the first merchant vector into the neural network to determine a plurality of associated merchants with corresponding vector representations that include a desired probability of association with the first merchant vector based on the weights.

The processor may be further configured to select a second merchant from the plurality of associated merchants based on the probability that the vector representation corresponding to the second merchant is associated with the first merchant vector, and transmit the second merchant to a first device corresponding to the first user.

The processor may be further configured for converting user data corresponding to the first user into a user vector, and inputting the user vector into the neural network to generate a probability that the user vector is associated with each vector representation in the historical datasets. The processor may further be configured to select a third merchant from the plurality of merchants based on the probability that the vector representation corresponding to the second merchant is associated with the user vector.

The neural network may be trained using skip-gram modelling of the corresponding vector representations based on the historical browsing sessions. Each historical dataset may include historical browsing sessions with a predetermined minimum number of merchants.

The second merchant may be selected based on having a corresponding vector representation with the highest cosine similarity score with the first merchant vector. A predetermined number of merchants with the highest cosine similarity scores may be selected and presented in the new browsing session.

The vector representations may be grouped based on the geographic location of the corresponding merchants in the historical datasets. The first merchant and the second merchant may be within the same geographic group.

Other implementations of this disclosure include corresponding devices, systems, and computer programs, as well as and associated methods for dynamically predicting similarity values. These other implementations may each optionally include one or more of the following features. For instance, provided is a programmable device configured for generating dynamic similarity predictions of merchants using a neural network. The programmable device is configured to operate in a training mode and an inference mode.

In the training mode, the programmable device is configured to receive a plurality of historical datasets including a plurality of merchants corresponding to historical browsing sessions generated by one or more users. Each merchant in the historical datasets may then be converted into a corresponding vector representation. Each corresponding vector representation may then be input into the neural network to generate weights corresponding to dimensions of the vector representations.

In the inference mode, the programmable device is configured to receive a new dataset corresponding to a new browsing session generated by a first user. The new dataset includes a first merchant of the plurality of merchants. The first merchant in the new dataset may be converted into a corresponding first merchant vector. The first merchant vector is input into the neural network to determine a plurality of associated merchants with corresponding vector representations that include a desired probability of association with the first merchant vector based on the weights.

A second merchant is then selected from the plurality of associated merchants based on the probability that the vector representation corresponding to the second merchant is associated with the first merchant vector. The second merchant is then transmitted to a first device corresponding to the first user.

The programmable device may further be configured to convert user data corresponding to the first user into a user vector, and input the user vector into the neural network to generate a probability that the user vector is associated with each vector representation in the historical datasets. The programmable device may further be configured to select a third merchant from the plurality of merchants based on the probability that the vector representation corresponding to the third merchant is associated with the user vector.

The neural network may be trained using skip-gram modeling of the corresponding vector representations from the historical browsing sessions. Each historical dataset includes historical browsing sessions with a predetermined minimum number of merchants.

The second merchant may be selected based on having a corresponding vector representation with the highest cosine similarity score with the first merchant vector. A predetermined number of merchants with the highest cosine similarity scores may be selected and presented in the new browsing session.

The vector representations may be grouped based on the geographic location of the corresponding merchants in the historical datasets. The first merchant and the second merchant may be within the same geographic group.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

FIG. 10 illustrates a particular example of a computer system that can be used with various embodiments of the present disclosure.

DETAILED DESCRIPTION OF PARTICULAR EMBODIMENTS

Figure 1:
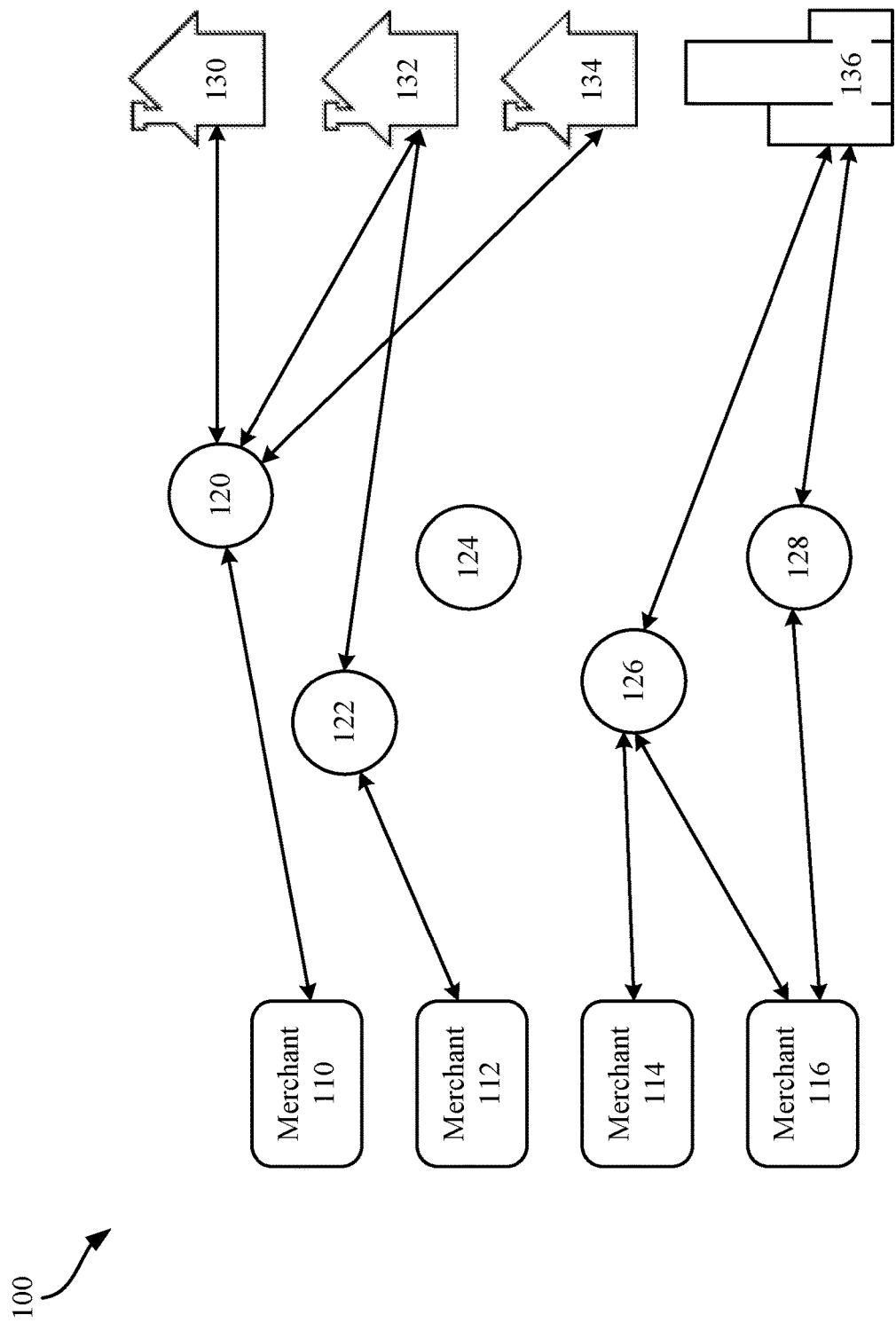
FIG. 1 illustrates one example of a delivery logistics system having multiple merchants, couriers, and customers, in accordance with one or more embodiments.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

For example, the techniques of the present disclosure will be described in the context of particular protocols, such as Wi-Fi or Bluetooth. However, it should be noted that the techniques of the present disclosure may also be applied to variations of protocols. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

With regard to the present disclosure, real-time on-demand deliveries of perishable goods may be requested by various users in a delivery platform system. Such users may include customers that are browsing merchants, such as restaurants. It may be desired to provide such customers with targeted suggestions of merchants related to search terms and merchants viewed during a browsing session. As used herein, the term "provider" may be used to describe various types of merchants that provide goods, including perishable goods, and the terms "provider" and "merchant" may be used interchangeably. As used herein, the term "delivery associate" may be used to describe a driver or courier that delivers the goods provided by the merchant to a customer, and the terms "delivery associate" and "courier" may be used interchangeably.

Overview

In current systems, similar merchants may be identified by category, such as cuisine type, price range, etc. Other methods may include collaborative filtering techniques based on purchases made by customers. However, these existing methods require explicit encoding of data and may not necessarily capture latent user preferences that are implicit in browsing activity.

According to various embodiments, a delivery platform system is provided which includes a predictive model for generating merchant similarity predictions. The system is configured to receive historical datasets corresponding to stored historical browsing sessions generated by one or more customers. The datasets may include merchant information and may be stored in a network storage or other memory. The merchants from the historical browsing sessions may be ordered and converted into vector representations to generate a merchant glossary. The glossary may be used as a training corpus to train a predictive model to output probabilities of association between a target merchant and one or more context merchants which have been previously searched for, viewed, or selected by a customer in a historical browsing session.

In example embodiments, the predictive model may include a neural network with one or more computational layers. Merchant vectors may be input as an input layer to generate vector space matrices with a predetermined number of dimensions. The neural network may be trained to learn the relationship between merchants based on the historical browsing sessions, such as the order and frequency that the customers browse, select, or order from the merchants. For example, skip-gram modeling may be used to train the neural network to output probabilities that one or more other context merchants are associated with an input target merchant.

As such, subsequent datasets may be received from a current browsing session by a user. The subsequent datasets may include information corresponding to a first merchant that was selected by the customer in the current browsing session. This first merchant may be a merchant included in the merchant glossary. The first merchant is then converted into a vector representation and input as a target merchant.

Once the neural network outputs probabilities for context merchants associated with the first merchant, one or more of the context merchants may be selected as targeted suggestions to the customer. In some embodiments, the context merchant having the highest cosine similarity value with the first merchant may be selected. In other embodiments, a predetermined number of context merchants may be selected.

The one or more selected merchants may then be transmitted to the customer at a user device and displayed in the current browsing session. Subsequent browsing activity may further be used to update the weighted vector space of the neural network.

The disclosed systems can be applied to determine merchant similarity predictions for particular users, as well as to determine similarities between items. As such, the disclosed systems may capture implicit user preferences without explicit encoding of features or characteristics of the store or the consumer. Furthermore, provided is a technique for co-embedding two different entities, such as merchants and customers, in the same dimensional space, to provide an effective method for understanding merchant-customer relationships.

Example Embodiments

With reference to FIG. 1, shown is an example of a delivery platform system 100 implemented for multiple merchants, couriers, and customers, in accordance with one or more embodiments. As used herein, the term "delivery logistics system" may be used interchangeably with the terms "logistics platform" or "delivery platform." In the present example, the delivery platform system 100 provides real-time, on-demand, delivery of perishable goods. For instance, a customer may order food from a restaurant by using a mobile device application that places the order through the delivery platform. In some instances, the user may also access the delivery platform through the internet via a computer, laptop, tablet, etc. When the customer orders the food through the delivery platform, the order is prepared at a provider site, where a delivery associate will then pick up the order and deliver the order from the provider site to the customer.

As shown in FIG. 1, system 100 includes providers 100, 112, 114, and 116. According to various examples, a provider may be a merchant that prepares perishable goods such as food at a restaurant. Other such merchants may be any combination of one or more of the following: restaurants, bars, cafes, or other vendor of food or beverages, such as a hotel. Such venues may also be referred to herein as HORECA (Hotel/Restaurant/Café) which is a term or abbreviation used to describe entities in the food service industry.

However, in some examples, provider sites may also provide other perishable goods such as floral arrangements, medications, refrigerated or frozen items, live animals, etc. that may need real-time, on-demand delivery to a customer. Accordingly, although various examples in the present disclosure may describe the provider sites and delivery platform in the context of restaurants and food delivery, the mechanisms and processes described herein may also be applied to the delivery of various other perishable and non-perishable items. As used herein, the terms "provider" and "merchant" may be used interchangeably.

System 100 also includes one or more couriers 120, 122, 124, 126, and 128. Such couriers may be on foot, or traveling by vehicle, such as a car, scooter, bicycle, etc. In various embodiments of system 100, one or more couriers may be directed to one or more merchants to receive an order placed by customers and deliver the orders to the customers located at corresponding destinations 130, 132, 134, or 136, which may be residential or commercial addresses. In some embodiments, the destinations may correspond to a particular geo-location determined by GPS or other coordinate system.

In various embodiments, the delivery platform may determine the estimated time arrival (ETA) of delivery of the order to the customer once the order has been placed. This ETA may be provided to the customer. The ETA of delivery of an order may be estimated based on tracked events or milestones corresponding to the order. As used herein, the terms "events" may be used interchangeably with "milestones." The customer may also be provided with information regarding the status of the order, events, or milestones.

The customer may also be provided with other information, such as information corresponding to the courier, etc. Information regarding the status of the order, events, or milestones may also be provided to the merchants and the couriers.

Figure 2:
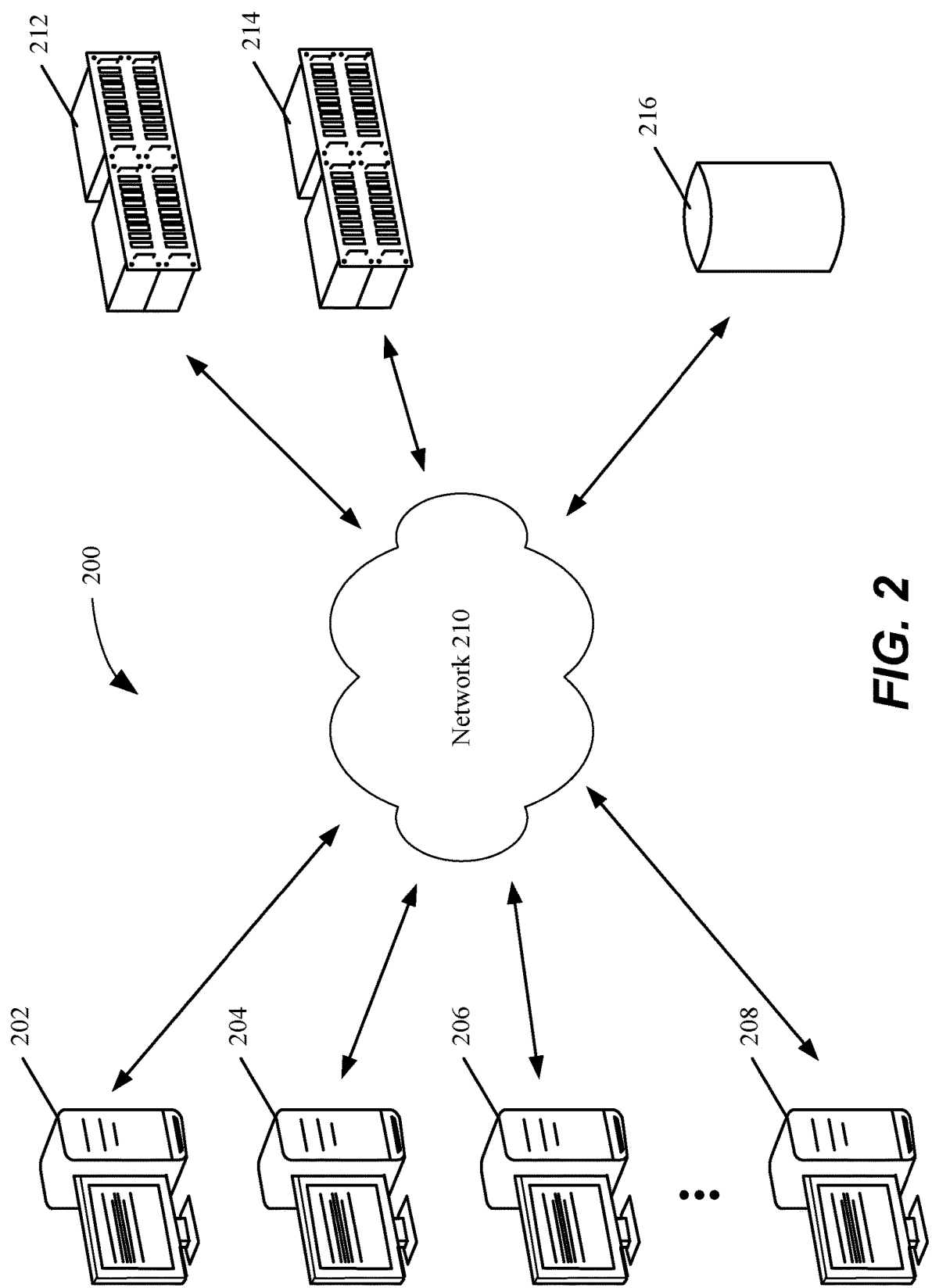
FIG. 2 illustrates a diagram of an example network architecture for implementing various systems and methods of the present disclosure, in accordance with one or more embodiments.

In various embodiments, one or more of the events described herein may be transmitted to client devices corresponding to customers, merchants, or couriers. FIG. 2 illustrates a diagram of an example network architecture 200 for implementing various systems and methods of the present disclosure, in accordance with one or more embodiments. The network architecture 200 includes a number of client devices 202-208 communicably connected to one or more server systems 212 and 214 by a network 210. In some embodiments, server systems 212 and 214 include one or more processors and memory. The processors of server systems 212 and 214 execute computer instructions (e.g., network computer program code) stored in the memory to perform functions of a network data exchange server. In various embodiments, the functions of the network data exchange server may include routing real-time, on-demand, delivery of perishable goods, and/or predicting and dynamically updating estimated time of arrivals (ETAs) for such deliveries.

In some embodiments, server system 212 is a content server configured to receive and store network profile information. In some embodiments server system 214 is a dispatch server configured to transmit and/or route network data packets including network messages. In some embodiments, content server 210 and dispatch server 212 are configured as a single server system that is configured to perform the operations of both servers.

In some embodiments, the network architecture 200 may further include a database 216 communicably connected to client devices 202-208 and server systems 212 and 214 via network 210. In some embodiments, network data, or other information such as user information, courier information, and merchant information, may be stored in and/or retrieved from database 216.

Users of the client devices 202-208 access the server system 212 to participate in a network data exchange service. For example, the client devices 202-208 can execute web browser applications that can be used to access the network data exchange service. In another example, the client devices 202-208 can execute software applications that are specific to the network (e.g., networking data exchange "apps" running on smartphones).

Users interacting with the client devices 202-208 can participate in the network data exchange service provided by the server system 212 by distributing digital content, such as text comments (e.g., updates, announcements, replies), digital photos, videos, online orders, payment information, activity updates, location information, or other appropriate electronic information. In some implementations, information can be posted on a user's behalf by systems and/or services external to the network or the server system 212. For example, the user may post a review of a restaurant to a restaurant review website, and with proper permissions that website may cross-post the review to the network on the user's behalf. In another example, a software application executed on a mobile device, with proper permissions, may use global positioning system (GPS) capabilities to determine the user's location and automatically update the network with his location (e.g., "At Home", "At Work", "In San Francisco, Calif.").

In some implementations, the client devices 202-208 can be computing devices such as laptop or desktop computers, smartphones, personal digital assistants, portable media players, tablet computers, or other appropriate computing devices that can be used to communicate with an electronic social network. In some implementations, the server system 212 can include one or more computing devices such as a computer server. In various embodiments, each of client devices 202-208 may be any one of merchant devices corresponding to merchants 110-116, courier devices corresponding to couriers 120-128, or customer devices corresponding to customers 130-136.

In some implementations, the server system 212 can represent more than one computing device working together to perform the actions of a server computer (e.g., cloud computing). In some implementations, the network 210 can be a public communication network (e.g., the Internet, cellular data network, dial up modems over a telephone network) or a private communications network (e.g., private LAN, leased lines).

Various customers, merchants, and couriers may transmit and receive information related to one or more orders to the servers 212 or 214 via corresponding client devices. The system may then utilize information received from various devices to calculate the ETA of the delivery of the order, as well as dynamically updating the ETA when updated timestamps are received. The predicted ETAs may further be used by a delivery routing system for pairing orders to couriers and merchants for delivery. Such information may include order information, payment information, activity updates, timestamps, location information, or other appropriate electronic information. For example, a selection of one or more merchants may be received from a customer device with a request to view available items for order. Information corresponding to the selected merchants may be retrieved from database 216 and transmitted to the customer device.

Figure 3:
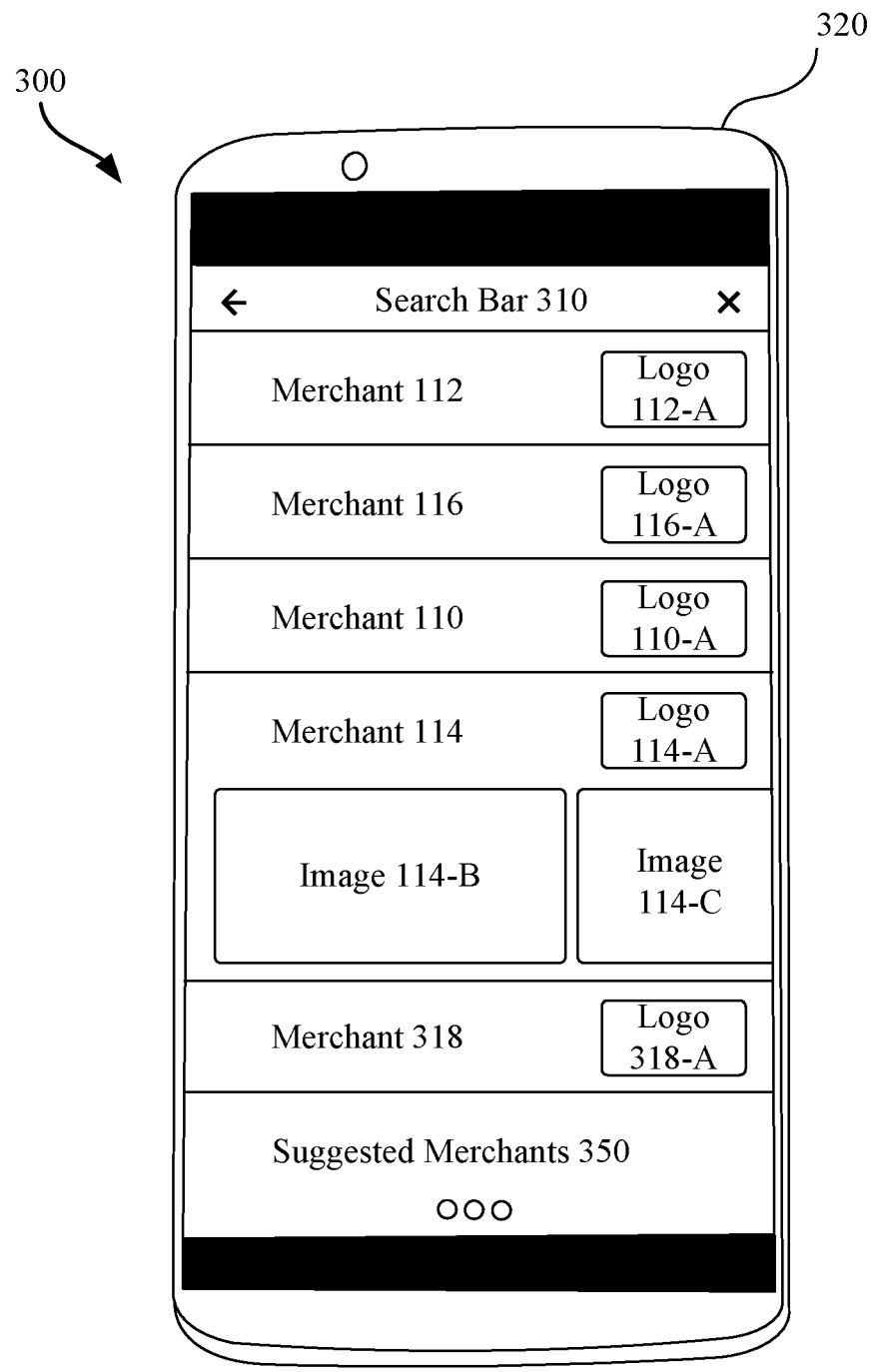
FIG. 3 illustrates an example of an example user interface on a client device corresponding to a customer, in accordance with one or more embodiments.

With reference to FIG. 3, shown is an example user interface 300 on a client device corresponding to a customer, in accordance with one or more embodiments. In some embodiments, client device 320 may be a customer device corresponding to any one of customers 130-136. In various embodiments, interface 300 includes search bar 310. A customer may begin a browsing session by inputting search terms in search bar 310 to retrieve merchant information relating to the search terms. For example, a customer may input a type of food, such as Mexican, Japanese, lunch, dinner, spicy, etc., to retrieve merchants or restaurants that serve items relating to the particular search term. As another example, a customer may input the name of a particular merchant. In various embodiments, the customer may enter various other search criteria, such as location, search radius, hours of operation, etc.

Based on the input search terms, various merchants may be retrieved and presented in interface 300. As illustrated in FIG. 3, the search results are displayed as a list of merchants is displayed. The search results include merchants 110, 112, 114, 116, and 318. In the present example, the list of merchants may correspond to restaurants, bars, cafes, or other vendors of food or beverages that relate to the search terms. In some embodiments, the list of merchants may be ordered based on various criteria, such as merchant rating, relative distance from the device or address, price point, etc. In some embodiments, results may be ordered based on relevance to the search terms. Various systems and methods for determining relevance of merchants for generating search results and ordering such results are further described below.

In various embodiments, the search results may include additional information for each result, such as merchant logos. As shown, logo 110-A, 112-A, 114-A, 116-A, and 318-A are displayed within corresponding merchants 110, 112, 114, 116, and 318, respectively. In some embodiments, search results may display images, such as images 114-B and 114-C corresponding to merchant 114. Such images may include images of various order items, the merchant storefront or interior, or other relevant content. The search results may further include additional information, such as distance from the device, merchant rating, estimated delivery time, etc.

The customer may then select any one of the merchants provided in the search results to retrieve information for the selected merchant, including available items, order information, additional images, etc. In a particular browsing session, a customer may return to the search results or input additional terms in search bar 310 to select one or more merchants before selecting items and placing an order.

In some embodiments, interface 300 includes a suggested merchant section 350. In various embodiments, suggested merchant section 350 includes a list of one or more suggested merchants based on the search terms. In some embodiments, suggested merchant section 350 includes a list of one or more suggested merchants based on merchant selections by a customer during the particular browsing session. The suggested merchants may be targeted to the particular customer. Various systems and methods for determining associated merchants are further described below.

Figure 4:
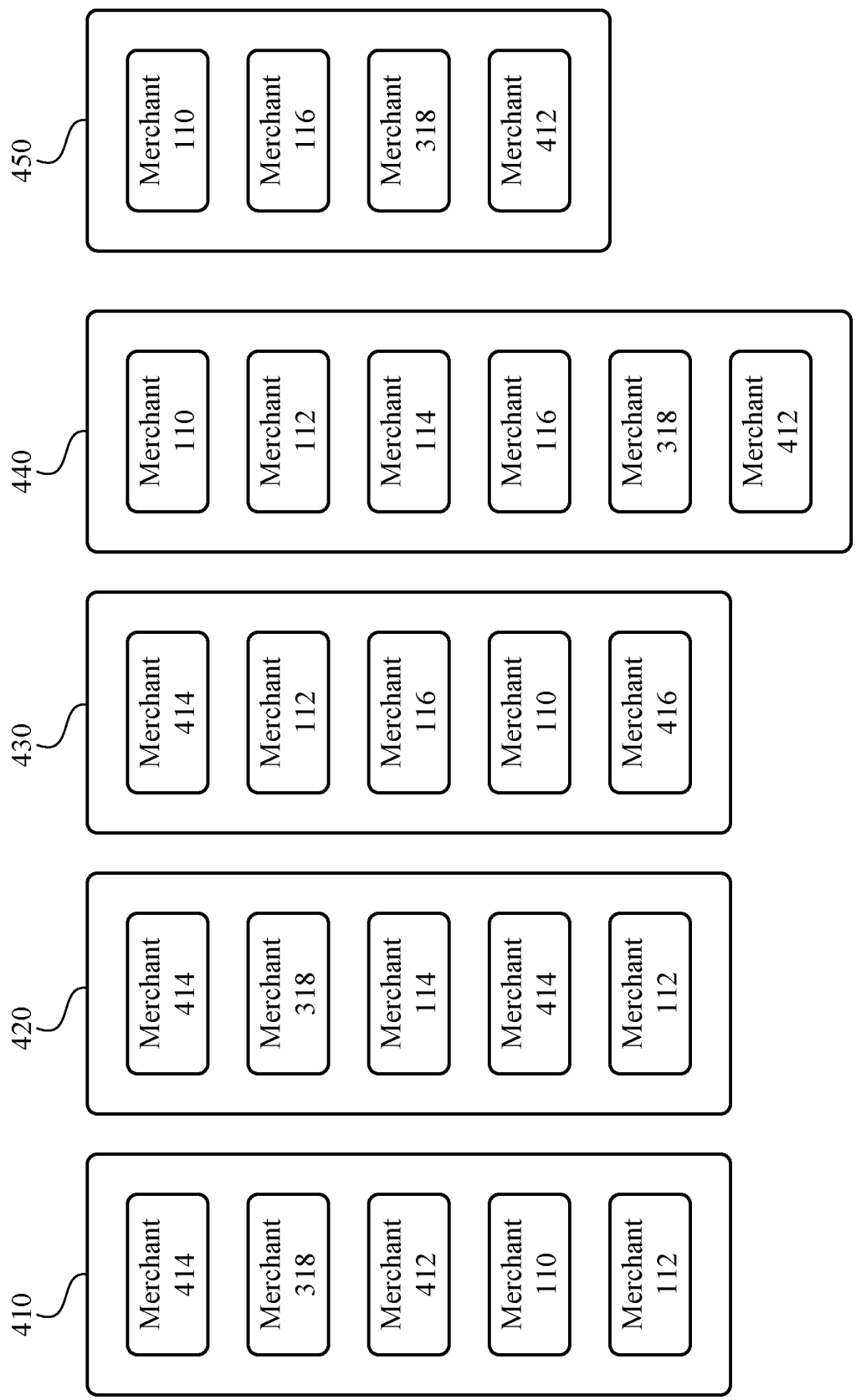
FIG. 4 illustrates an example of browsing sessions by one or more customers, in accordance with one or more embodiments.

With reference to FIG. 4, shown is an example of browsing sessions by one or more customers, in accordance with one or more embodiments. Illustrated are five browsing sessions, session 410, 420, 430, 440, and 450. For example, a customer using an interface 300, may input search results and create browsing session 410 by selecting merchants 414, 318, 412, 110, and 112. Browsing session 420 includes selection of merchants 414, 318, 114, 414, and 112. Browsing session 430 includes selection of merchants 414, 112, 116, 110, and 416. Browsing session 440 includes selection of merchants 110, 112, 114, 116, 318, and 412. Browsing session 450 includes selection of merchants 110, 116, 318, and 412.

The illustrated browsing sessions in FIG. 4 may be generated by one or more different customers and are exemplary browsing sessions for explanatory purposes. It should be recognized that browsing sessions may include a fewer or greater number of merchant selections. In some embodiments, more than one instance of the same restaurant may be recorded for a browsing session if the restaurant is selected multiple times. For example, a customer may have browsed merchant 414 twice in browsing session 420 which includes two instances of merchant 414. The order that each merchant is browsed or visited by the customer may be tracked in each browsing session. Each browsing session may be referred to as a historical browsing session and stored at delivery platform system 100, such as in storage 216. Such browsing sessions may be referred to as historical browsing session.

In some embodiments, a historical browsing session may be stored after the browsing session ends. A browsing session may end after the customer selects items from a particular merchant and places the order. In other embodiments, a browsing session may end when the customer closes the user interface 300. In some embodiments, certain requirements must be met before a browsing session is stored as a historical browsing session. For example, only browsing sessions in which an order is placed may be stored.

As another example, a predetermined minimum number of merchant selections by a customer during the browsing session may be required before the browsing session is stored as a historical browsing session. In yet another example, only merchants that have been viewed by a predetermined minimum number of customers may count toward the minimum number of merchant selections in a particular browsing session.

In some embodiments, a historical browsing session may correspond to one or more merchants selected, viewed, or searched for by the customer via other sources, such as a link to the merchants transmitted to the customer via text, email, or other application. In some embodiments, such historical browsing sessions may be combined and stored as a single historical browsing session. In some embodiments, such historical browsing sessions may be grouped by the sources through which the customer selected, viewed, or searched for the merchants.

Figure 5:
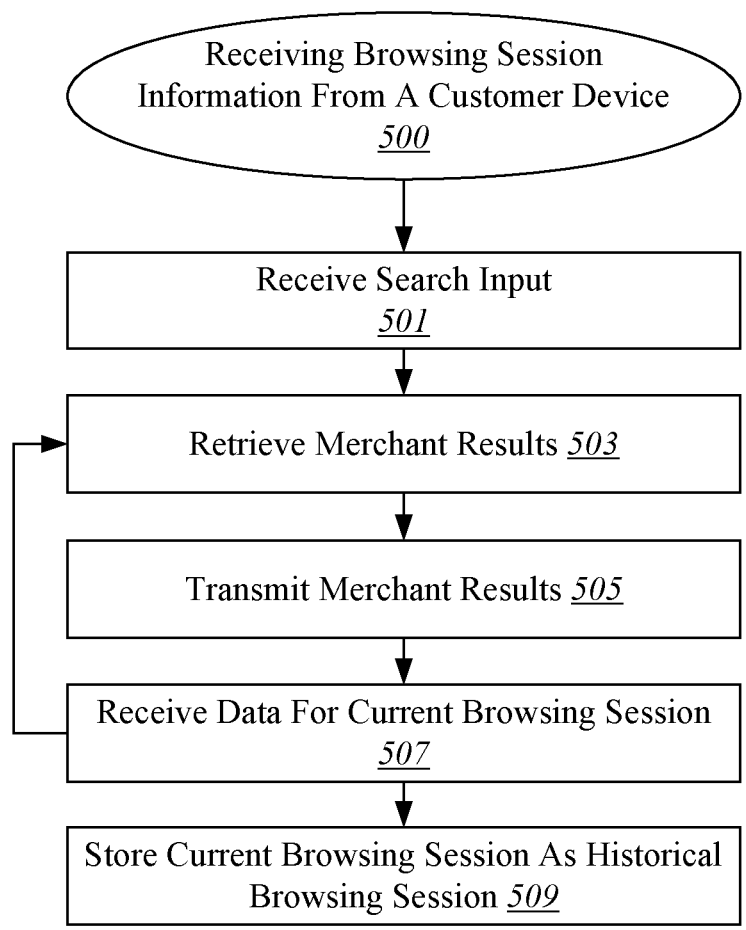
FIG. 5 illustrates an example process for receiving browsing session information from a customer device, in accordance with one or more embodiments.

FIG. 5 depicts an example flow chart of an example process 500 for receiving browsing session information from a customer device. At 501, a search input is received. In some embodiments, a customer may begin a current browsing session by inputting search terms into a user interface, such as in search bar 310 of user interface 300. In some embodiments the search input may include one or more search terms entered into search bar 310 by a customer in a user interface such as interface 300 on a corresponding customer device, such as 202-208. In some embodiments, the search input may be places in a web browser or an application installed in the customer device. The order information may be transmitted via network 210.

In some embodiments, the search input may include location information corresponding to the location for delivery of the order. For example, the location of the customer device may be determined via GPS. As another example, the location information may include an address corresponding to the customer. The search input may further include additional information, such as order items, payment information, and other customer information.

At 503, merchant results are retrieved. In some embodiments, merchant results are retrieved from system storage, such as storage 216. As previously described, merchant results may be retrieved based on the search input, including location, food type, item type, merchant rating, etc. At 505, merchant results are transmitted to the customer device. In some embodiments, the merchant results are displayed as a list of merchants. As previously described, the list may be ranked or ordered based on various criteria, such as merchant rating, relative distance from the device or address, price point, etc. In some embodiments, results may be ordered based on relevance to the search terms.

At 507, the browsing data of the current browsing session is received. The browsing data of a particular browsing session may include various types of data including selected merchant information, items viewed, items ordered, and search terms. At 509, the current browsing session is stored as a historical browsing session. As previously described, the current browsing session may only be saved as a historical browsing session if certain requirements are met, such as a minimum number of merchants selected.

In some embodiments, the data of the current browsing session may be used to retrieve additional related search results at 503. In some embodiments, a delivery platform system uses a neural network to dynamically generate predictions of merchants that are associated with the browsing activity of the current session, as further described below. Such merchant predictions may be transmitted to the customer device at 505 as additional updated search results. In some embodiments, such merchant predictions may be displayed at the customer device as suggested merchants 350 previously described.

In various embodiments, the merchants included in stored historical browsing sessions, such as those received and stored via method 500, may be used to train a predictive model for generating probabilities of association between each merchant. In some embodiments, the predictive model may be a predictive merchant association model with one or more various machine learning processes. In an example embodiment, the predictive model may include a neural network of one or more computational layers that may generate a weighted vector space of merchants. In various embodiments, the merchants from historical browsing sessions are converted into corresponding vector representations input into one or more computational layers of a neural network to generate the vector space of merchants.

Figure 6:
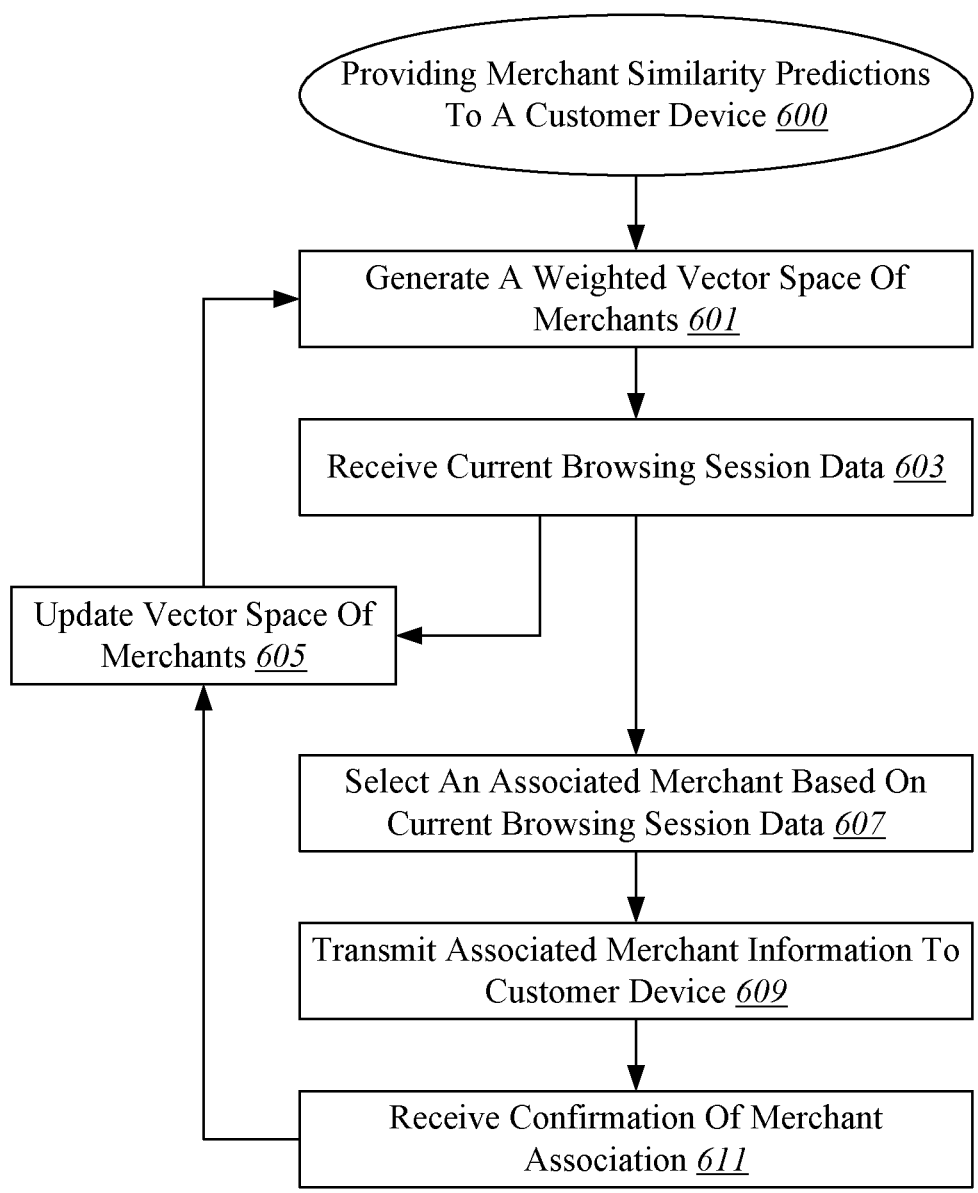
FIG. 6 illustrates an example process for providing merchant similarity predictions to a customer device, in accordance with one or more embodiments.

FIG. 6 illustrates and example process 600 for providing merchant similarity predictions to a customer device, in accordance with one or more embodiments. At operation 601, a weighted vector space of merchants is generated. In various embodiments, a vector space of merchants is generated based on the merchants included in various historical browsing sessions, such as those received and stored in method 500.

Various processes may be implemented to convert merchants into vector representations. In some embodiments, each merchant may be vectorized via one-hot encoding based on the presence of the particular merchant among other merchants in various stored historical browsing sessions. In some embodiments, the merchants may be converted into vector representations based on alphabetical ordering of the names of the merchants. For example, in the browsing sessions shown in FIG. 4, the eight merchants may be alphabetically ordered in the following sequence: merchant 110, merchant 112, merchant 114, merchant 116, merchant 318, merchant 412, merchant 414, and merchant 416. As such, merchant 114 may be converted into a vector of [0, 0, 1, 0, 0, 0, 0, 0] based on such ordering, while merchant 416 may be converted into a vector of [0, 0, 0, 0, 0, 0, 0, 1]. In other embodiments, each merchant may be assigned numerical identifiers and numerically ordered based on the assigned numerical identifiers before being converted into vectors.

A glossary of merchant vectors may be created from all merchants included in a set of historical browsing sessions. In some embodiments, the merchants in stored historical browsing sessions may be grouped based on geographic location such that separate merchant glossaries are generated for different geographic locations or neighborhoods. In one example, browsing sessions 410, 420, and 430 may correspond to a predetermined geographic area.

Different approaches may be implemented to process the merchant vectors in such vector space model including count-based methods (e.g. Latent Semantic Analysis), and predictive methods (e.g. neural probabilistic language models). Count-based methods compute the statistics of how often some merchants co-occurs with its neighbor merchants in a large corpus of historical browsing sessions, and then maps these count-statistics down to a small, dense vector for each merchant. Predictive models directly try to predict a merchant from its neighbors in terms of learned small, dense embedding vectors (considered parameters of the model).

Figure 7:
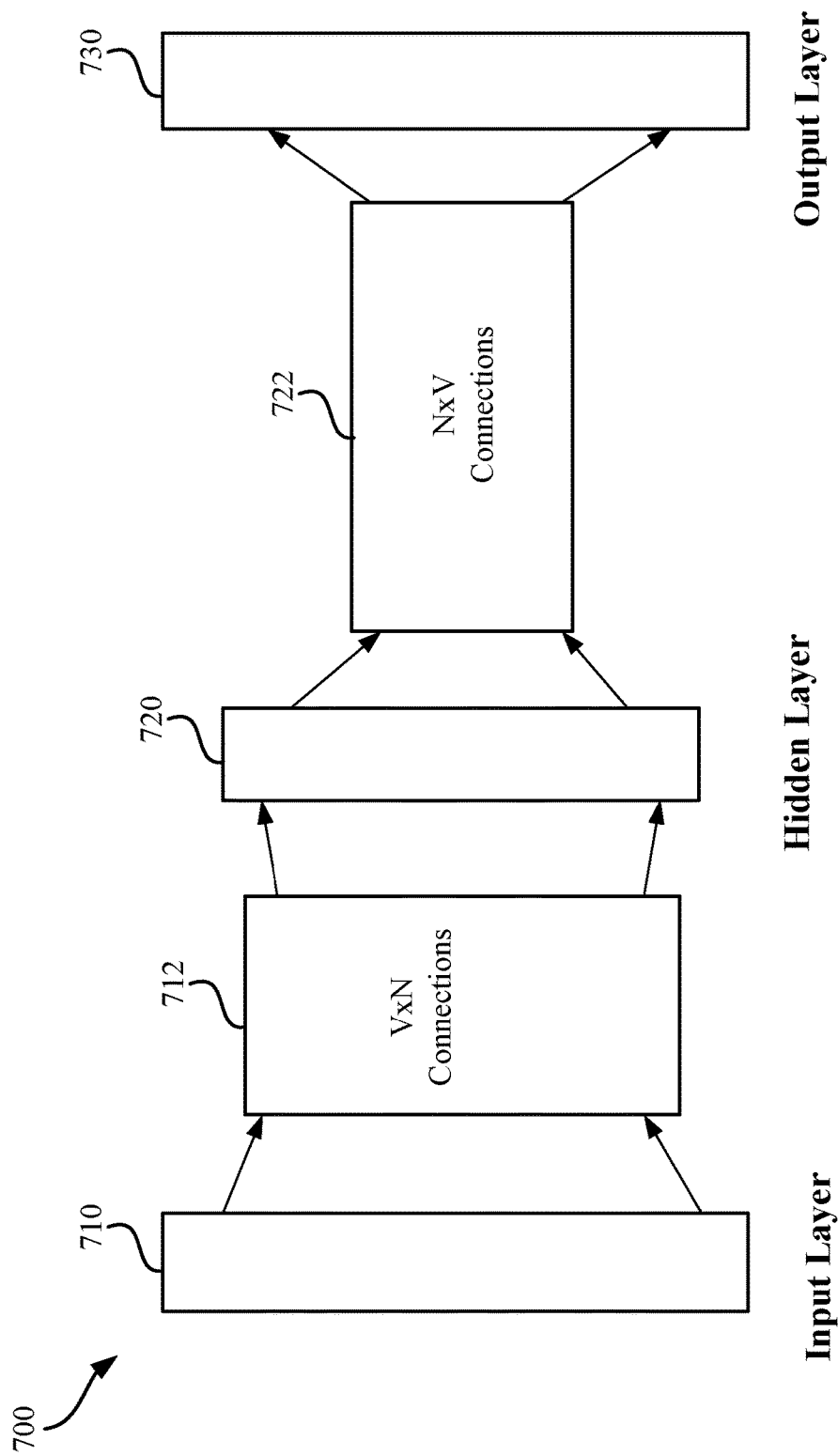
FIG. 7 illustrates an example of computational layers implemented in a neural network for generating a vector space model of merchants, in accordance with one or more embodiments.

A predictive merchant association model similar to Word2vec may serve as a computationally-efficient predictive model for learning merchant embeddings from raw browsing sessions. FIG. 7 illustrates an example of computational layers implemented in a neural network 700 for generating a vector space model of merchants, in accordance with one or more embodiments. According to one aspect, the predictive merchant association model may include a neural network 700 that is trained to reconstruct browsing contexts of merchants in a browsing session. In some embodiments, neural network 700 may be a two layer neural network including input layer 710 with corresponding matrix 712, hidden layer 720 with corresponding matrix 722, and output layer 730. In some embodiments, neural network 700 is a single hidden layer, fully connected neural network. However, in various embodiments, neural network 700 may include various other computational layers and configurations, including, but are not limited to, linear layers, convolution layers, deconvolution layers, residual layers, quadratic layers, etc.

The neurons in the hidden layer may all be linear neurons. Input layer 710 may be set to have as many neurons as there are merchants in the glossary for training. The size of hidden layer 720 may be set to the dimensionality of the resulting merchant vectors. The size of output layer 730 may be the same as that of input layer 710. For example, the glossary for learning merchant vectors may consist of V merchants and each merchant vector may consist of N dimensions. The input into hidden layer 720 may then be represented by matrix 712 of size V×N with each row representing a merchant in the glossary. In same way, the connections from hidden layer 720 to output layer 730 can be described by matrix 722 of size N×V. In this case, each column of matrix 722 represents a merchant from the given glossary. In some embodiments, the input to the network is encoded using "1-out-of-V" representation, or one-hot encoding, meaning that only one input line is set to one and rest of the input lines are set to zero.

In the present example, a training corpus may include stored historical browsing sessions 410, 420, and 430. A plurality of vector representations is then input as an input layer into a predictive merchant association model to generate a vector space, with each unique merchant assigned a corresponding vector in the space. In this training corpus includes eight merchants: merchants 110, 112, 114, 116, 318, 412, 414, and 416. Once ordered (alphabetically, numerically, etc.), each merchant may be referenced by its index corresponding to its one-hot vector. For this example, the neural network includes eight input neurons and eight output neurons. Also for this example, three neurons are used in hidden layer 720. Thus matrix 712 and matrix 722 will be 8×3 and 3×8 matrices, respectively. In some embodiments, before training begins, these matrices are initialized to small random values as is usual in neural network training. In this example, matrix 712 is initialized to the following values in Table 1 below and matrix 722 is initialized to the following values in Table 2.

TABLE 1

| | | |
|---|---|---|
| −0.094491 | −0.443977 | 0.313917 |
| −0.490796 | −0.229903 | 0.065460 |
| 0.072921 | 0.172246 | −0.357751 |
| 0.104514 | −0.463000 | 0.079367 |
| −0.226080 | −0.154659 | −0.038422 |
| 0.406115 | −0.192794 | −0.441992 |
| 0.181755 | 0.088268 | 0.277574 |
| −0.055334 | 0.491792 | 0.263102 |

TABLE 2

| 0.023074 | 0.479901 | 0.432148 | 0.375480 | −0.364732 | −0.119840 | 0.266070 | −0.351000 |
|---|---|---|---|---|---|---|---|
| −0.368008 | 0.424778 | −0.257104 | −0.148817 | 0.033922 | 0.353874 | −0.144942 | 0.130904 |
| 0.422434 | 0.364503 | 0.467865 | −0.020302 | −0.423890 | −0.438777 | 0.268529 | −0.446787 |

It should be recognized that, depending on the size of the glossary of merchants in the training corpus, the vector space may comprise as many as several hundred dimensions. The merchant vector representations may be positioned in the vector space such that associated merchants that share common characteristics are located in close proximity to one another in the vector space.

Using this weighted vector space in the above example, neural network 700 can learn the relationship between merchants, such as between merchant 112 and merchant 116. Thus, the weighted vector space may represent the relationship between various latent features of the merchants, such as food type, order items, location, and convenience. For example, merchant 112 and merchant 116 may include a similar food type such as Chinese food, or a similar price range, because the merchants appear in the same browsing session. Thus, merchant 116 may be of interest to another customer who searches for merchant 112 during a browsing session, or vice versa. Thus, the network should be trained to show a high probability for merchant 116 when merchant 112 is inputted into neural network 700.

As such, merchant 112 may be referred to as the context merchant and merchant 116 may be referred to as the target merchant. In this example, the input vector $X^t$ for merchant 112 may be $[0\ 1\ 0\ 0\ 0\ 0\ 0\ 0]^t$ representing the second position in the glossary of merchants. The target merchant will then be set as $[0\ 0\ 0\ 1\ 0\ 0\ 0\ 0]^t$.

With the input vector representation for merchant 112, the output, $H^t$, at the hidden layer neurons can be computed as:

$$H^t = X^t[\text{matrix 712}] = [-0.490796\ -0.229903\ 0.065460]$$

Then, with similar manipulations for hidden layer 720 to output layer 730, the activation vector for the output layer neurons can be written as:

$$H^t[\text{matrix 722}] = [0.100934\ -0.309331\ -0.122361\\ -0.151399\ 0.143463\ -0.051262\ -0.079686\\ 0.112928]$$

Neural network 700 may be configured to produce probabilities for various merchants in output layer 730, P(merchant$_k$|merchant$_{context}$) for k=1, V, to reflect the next merchant relationship with the context merchant at input. The output may be a probability for each merchant in the training corpus to appear in a randomly chosen position around the context merchant within a defined window. Therefore the sum of neuron outputs in output layer 730 may be set to equal 1. This may be achieved by converting activation values of output layer neurons to probabilities using a softmax function. Thus, the output $y_k$ of the $k^{th}$ neuron may be computed by the following expression:

$$y_k = P(\text{merchant}_k|\text{merchant}_{context}) = \frac{\exp(\text{activation}(k))}{\sum_{n=1}^{V} \exp(\text{activation}(n))}$$

Where activation(n) represents the activation value of the $n^{th}$ output layer neuron.

Thus, the probabilities for the eight merchants in the training corpus may be computed as:

0.143073 0.094925 0.114441 0.111166 0.149289
0.122874 0.119431 0.144800

The fourth probability of 0.11166 represents the probability for the chosen target merchant 116. Given the target vector $[0\ 0\ 0\ 1\ 0\ 0\ 0\ 0]^t$, the error vector for the output layer is easily computed by subtracting the probability vector from the target vector. Once the error is known, the weights in the matrices 712 and 722 can be updated using backpropagation, such as via a stochastic gradient descent algorithm. Thus, the training may proceed by presenting different context-target merchant pairs from the corpus, allowing neural network 700 to learn the relationships between merchants and to develop a weighted vector space for merchants in the training corpus.

In various embodiments, the predictive merchant association model may implement various other training models, such as a Continuous Bag-of-Words model (CBOW) which predicts target merchants from source context merchants in a browsing session. In the CBOW model, context is represented by multiple merchants for a given target merchant. For example, merchant 112 and merchant 416 may be context merchants for merchant 116 as the target merchant. The architecture of neural network 700 may be modified by replicating the connections from input 710 to hidden layer 712 by C times, where C is the number of context merchants, and adding a divide by C operation in the hidden layer neurons.

With such configuration to specify C merchants, each merchant being coded using 1-out-of-V representation means that the hidden layer output 722 is the average of merchant vectors corresponding to context merchants at input. The output layer 730 remains the same and the training is done in the manner described above.

In other embodiments, a Skip-Gram model may be used, which does the inverse and predicts source context-merchants from a particular target merchant in a browsing session. In such embodiments, the target merchant is fed at the input 710, hidden layer 720 remains the same, and output layer 730 is replicated multiple times to accommodate the chosen number of context merchants. For example, merchant 112 and merchant 416 as context merchants, and merchant 116 as the target merchant, the input vector in the skim-gram model would be $[0\ 0\ 0\ 1\ 0\ 0\ 0\ 0]^t$, while the two output layers would have $[0\ 1\ 0\ 0\ 0\ 0\ 0\ 0]^t$ and $[0\ 0\ 0\ 0\ 0\ 0\ 0\ 1]^t$ as target vectors, respectively.

Thus, instead of producing one vector of probabilities, two such vectors would be produced for the current example. The error vector for each output layer is produced in the manner as discussed above. However, the error vectors from all output layers are summed up to adjust the weights via backpropagation. This ensures that weight matrix 722 for each output layer remains identical all through training.

In some embodiments, various skip-grams may be defined to create groups of target merchants and context merchants for training the neural network. Skip-grams may be defined as k-skip-n-grams where the skip distance k allows a total of k or less skips to construct the n-gram for a merchant in a stored browsing session. For example, a 0-skip-bi-gram of browsing session 410 may include the following bi-grams:

{merchant 414-merchant 318, merchant 318-merchant 412, merchant 412-merchant 110, merchant 110-merchant 112}. As another example, a 2-skip-bi-gram of browsing session 410 may include the following bi-grams: {merchant 414-merchant 318, merchant 414-merchant 412, merchant 414-merchant 110, merchant 318-merchant 412, merchant 318-merchant 110, merchant 318-merchant 112, merchant 412-merchant 110, merchant 412-merchant 112, merchant 110-merchant 112}.

The use of skip-grams may overcome issues arising from data sparsity. Models have shown that skip-gram modelling can be more effective in covering tri-grams than increasing the size of the training corpus (even quadrupling it), while also keeping misinformation to a minimum. In some embodiments, the predictive merchant association model may be determined to be sufficiently trained once a predetermined number of unique merchants have been input into the first layer. In other embodiments, the model may be determined to be sufficiently trained when merchants from a predetermined number of historic browsing sessions have been input into the first layer. For example, the model may be sufficiently trained when a generated matrix includes 500 merchants.

In various embodiments, feature learning in the neural network does not require a full probabilistic model. The CBOW and skip-gram models may instead be trained using a binary classification objective (logistic regression) to discriminate the real target merchants from imaginary (noise) merchants, in the same context. Using such noise-contrastive training, the objective is maximized when the model assigns high probabilities to the real merchants, and low probabilities to noise merchants. This may increase the speed at which the predictive merchant association model is trained.

Referring back to FIG. 6, data for a current browsing session is received at operation 603, such as described in operation 507 with reference to FIG. 5. For example, a customer may initiate a current browsing session on an application or web browser running on an associated customer device. Based on the merchants and other information included in the data for the current browsing sessions, one or more associated merchants are selected at operation 607. For example, a target merchant may be retrieved from the current browsing session data and input into a predictive model, such as neural network 700. In some embodiments, a target merchant may be selected from a stored historical browsing session associated with the customer. For example, a merchant may be randomly chosen as the target merchant from the most recent stored historical browsing session.

As previously described, neural network 700 may determine one or more context merchants that are associated with the target merchant based on the proximity of such associated merchants in the vector space to one or more merchants from the current browsing session. This may correspond to a predicted probability that the associated merchant is associated or related to the current browsing session.

In particular examples, one or more associated context merchants may be selected based on the target merchant received at 603. In some embodiments, an associated context merchant with the highest probability is selected. In some embodiments, a predetermined number of associated context merchants with the highest determined probabilities are selected. In another example, a predetermined number of associated context merchants may be selected at random from a group of associated context merchants with a probability above a particular threshold value. In some embodiments, an associated context merchant vector with the highest cosine similarity score to the target merchant vector is selected.

Associated context merchants may also be selected based on other measures of similarity and/or distance in the vector space. For example, Euclidean similarity measures may be used to select one or more associated context merchants with the closest Euclidean similarity measure values. As another example, Manhattan distance similarity measures may be used to select one or more associated context merchants. Various other similarity measures may also be additionally or alternatively implemented, including, but not limited to: Minkowski distance measurements and Jaccard similarity measurements.

At operation 609, the selected associated context merchant, and corresponding information, is transmitted to the customer device. The associated merchant may be displayed to the customer within the search results, or as a suggested merchant, as previously described with reference to FIG. 3. In some embodiments, one or more selected associated context merchants may be transmitted to the customer via alternative mechanisms. For example, the predictive merchant associated model may be used in conjunction with general recommendation systems, such as a customer preference recommendation system. As such, the selected associated context merchants may be transmitted to the customer in an email or text message. As another example, associated context merchants may be transmitted to the customer via a push notification in an application running on the customer device. Such notifications may be transmitted to the user at particular times of the day, such as during or just before customary meal times.

As previously described, in some embodiments, merchant or item selections in stored historical browsing sessions corresponding to a particular customer may be used to identify and select associated context merchants to transmit to the particular customer. As such, current browsing session data need not be received at step 603 to generate merchant predictions for a particular customer.

In some embodiments, the data for the current browsing session may be used to update the vector space of merchants at operation 605. This may cause an updated vector space of merchants in the neural network to be generated at 601, which may provide additional or different associated merchants at operation 607 based on a current browsing session.

In some embodiments, a confirmation of the merchant association is received at operation 611. The confirmation may comprise any one of various actions taken by a user, such as a customer. For example, the confirmation may be a selection of the associated merchant by the customer for browsing. In some embodiments, the confirmation occurs when an order made by the customer from the associated merchant. In yet other embodiments, the user interface may include a selection for the customer to confirm or rate the relevance of the associated merchant to the current browsing session. The confirmation of merchant association may then be used to update the vector space of merchants 605 for subsequent selections of associated merchants.

Figure 8A:
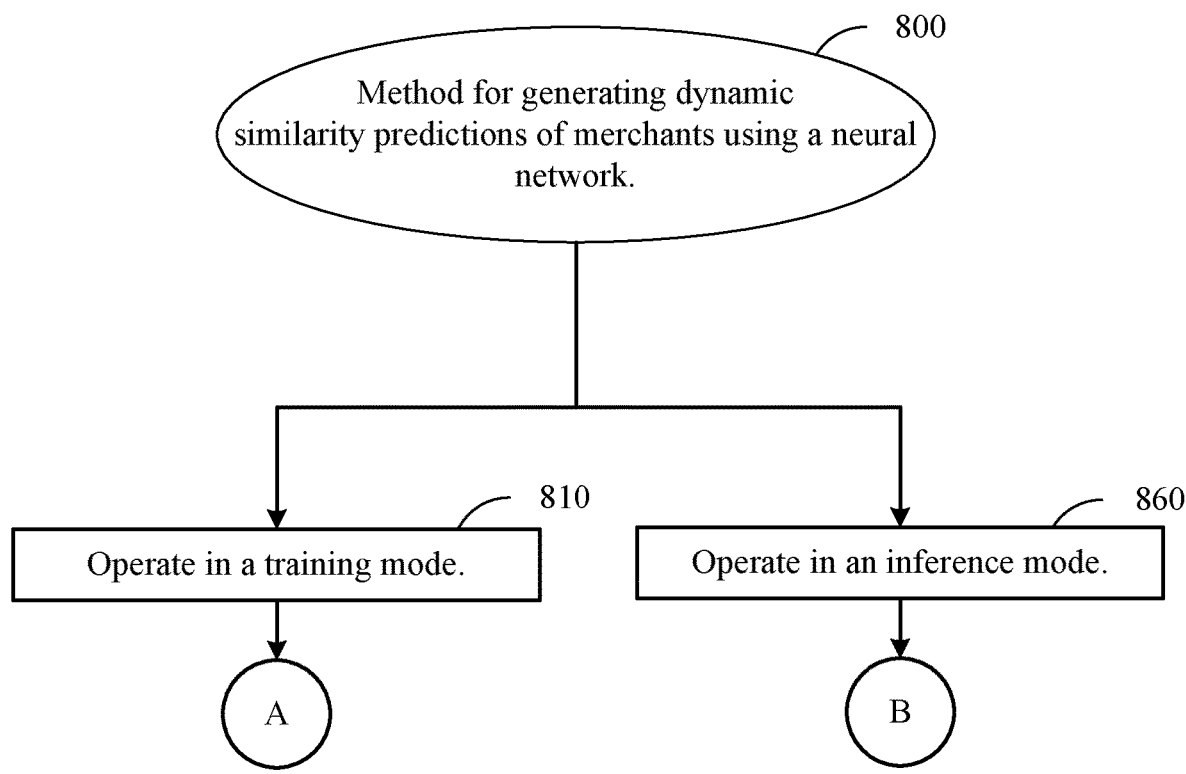
FIGS. 8A-8D illustrate an example method for generating dynamic similarity predictions of merchants using a neural network, in accordance with one or more embodiments.
Figure 8B:
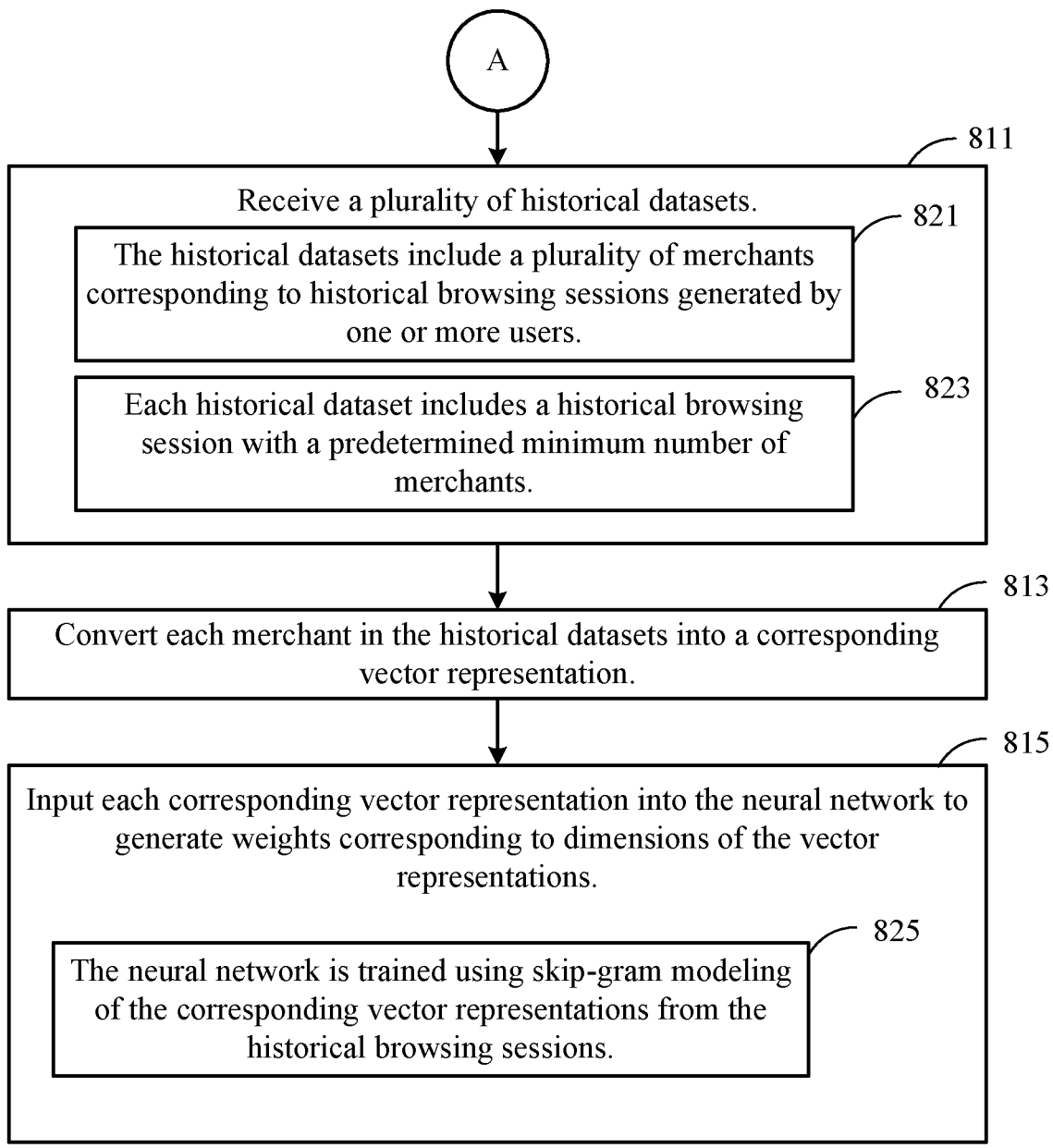
Figure 8C:
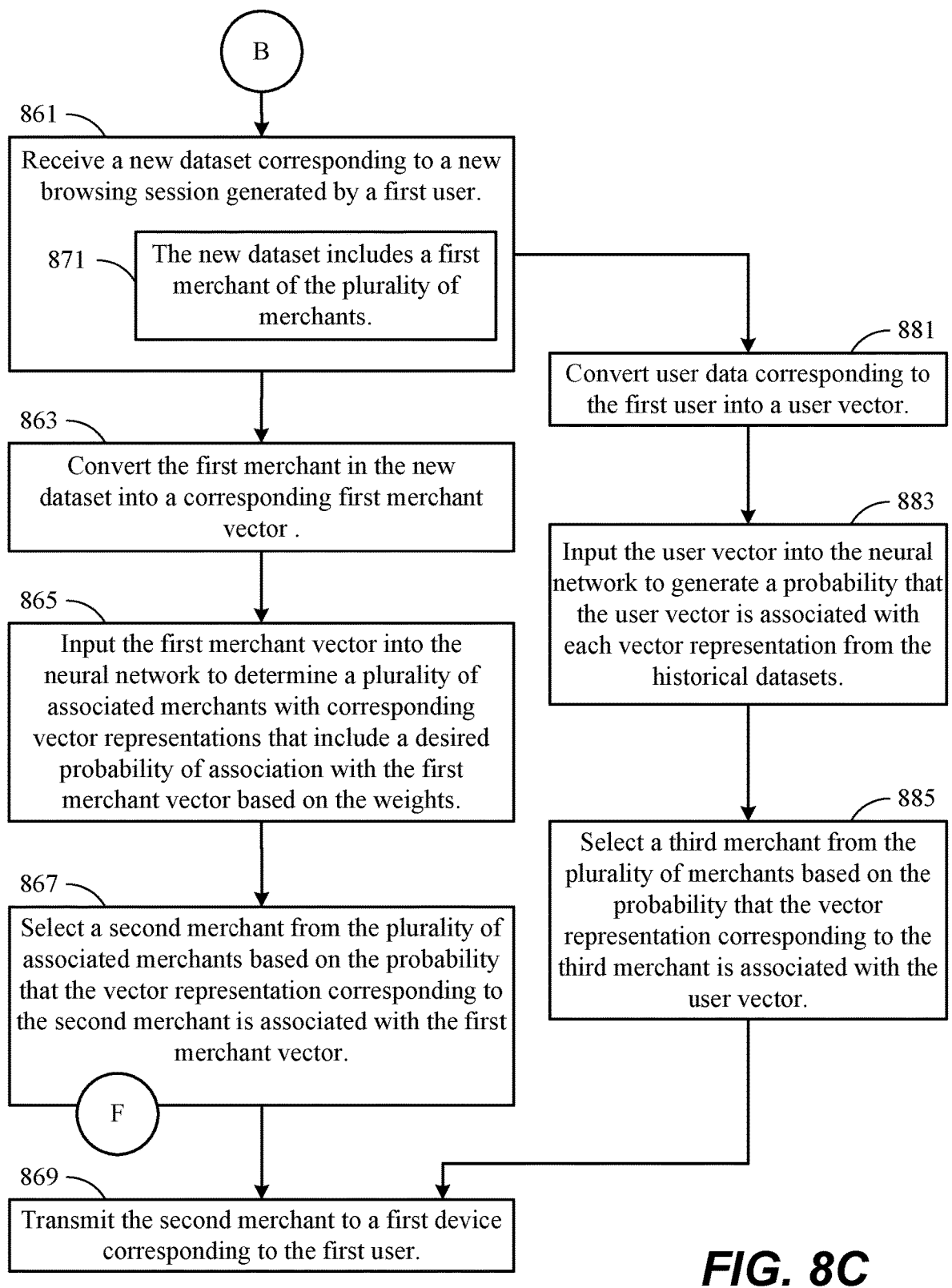
Figure 8D:
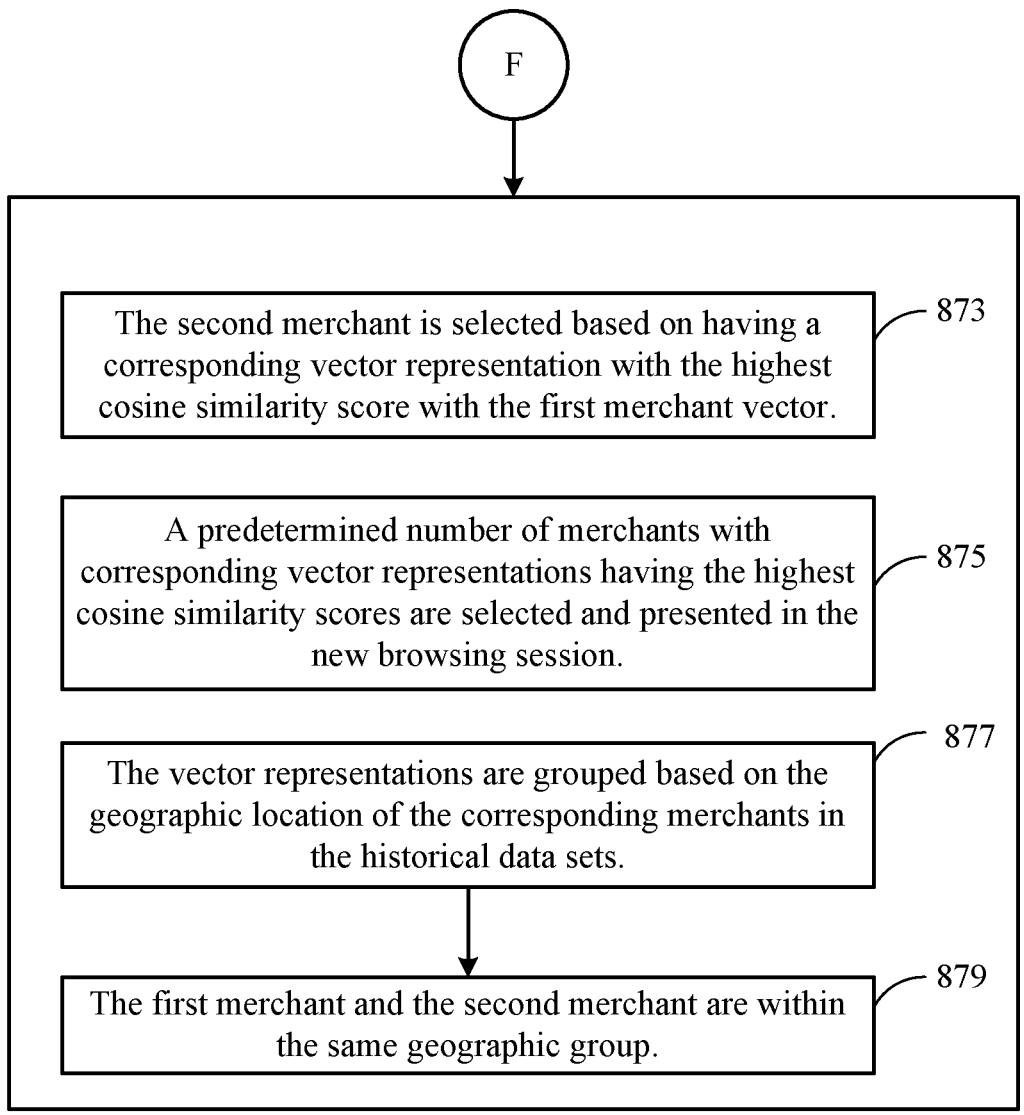

With reference to FIGS. 8A-8D, shown an example method 800 for generating dynamic similarity predictions of merchants using a neural network, in accordance with one or more embodiments. In certain embodiments, the neural network is a neural network within a delivery platform system. The neural network may comprise one or more computational layers. FIG. 8B illustrates an example of operations of the neural network in the training mode 810, and FIGS. 8C-8D illustrate an example of operations of the neural network in the inference mode 860, in accordance with one or more embodiments.

When operating in the training mode 810, a plurality of historical datasets 821 is received at operation 811. In some embodiments, the plurality of historical datasets 821 may correspond to stored historical browsing sessions. As such, the historical datasets 821 may include a plurality of merchants corresponding to historical browsing sessions 823 generated by one or more users. Such users may be customers as described herein with reference to the previous figures. The historical datasets 821 may include additional information relating to the merchants in the historical browsing session, such as merchant locations, food types, order items, and merchant ratings. As previously described, historical browsing sessions may only be stored if they meet certain predetermined criteria. For example, each historical dataset 823 includes a historical browsing session with a predetermined minimum number of merchants.

At operation 813, each merchant in the historical datasets is converted into a corresponding vector representation. Various processes may be used to convert merchants into vector representations. For example, each merchant may be vectorized via one-hot encoding based on a glossary of all merchants in various stored historical browsing sessions. A training corpus may be formed from the glossary and input into a neural network for training.

At operation 815, each corresponding vector representation is input into a first layer of the neural network to generate weights corresponding to dimensions of the vector representations. In various example embodiments, the neural network may be neural network 700 previously described. The neural network may include a first layer that is a hidden linear layer with linear neurons. The first layer may generate a matrix representing the merchants with corresponding dimensions. The first layer may result in a vector space model that represents the merchants in a continuous vector space where contextually similar merchants are mapped to nearby points. Thus, restaurants that serve similar items or are generally browsed together in browsing sessions may be embedded nearby each other. This captures latent underlying user preferences and other signals implicit in customer browsing history without specific encoding of such preferences and merchant attributes.

As previously described, a model similar to Word2vec may serve as a computationally-efficient predictive model for learning merchant embeddings from raw browsing sessions. Different training models may be implemented in the neural network, such as a Continuous Bag-of-Words model (CBOW). In certain examples, the neural network is trained using skip-gram modeling 825 of the corresponding vector representations from the historical browsing sessions 823. In skip-gram modelling, skip-grams are used to train the neural network to generate probabilities of association between a received target merchant and one or more associated context merchants. The skip-grams may be defined as k-skip-n-grams where the skip distance k allows a total of k or less skips to construct the n-gram for a merchant in a stored browsing session.

In some embodiments, the predictive merchant association model may be determined to be sufficiently trained once a predetermined number of unique merchants have been input into the first layer. In other embodiments, the model may be determined to be sufficiently trained when merchants from a predetermined number of historic browsing sessions have been input into the first layer. For example, the model may be sufficiently trained when a generated matrix includes 500 merchants.

In some embodiments, the glossary of merchants may be grouped based on geographic location. For example, there may be multiple sub-glossaries formed from the glossary of merchants where each sub-glossary includes merchants located within the same predefined neighborhood. The neural network may be trained based on the sub-glossaries which would create a greater association between merchants within a given neighborhood.

When operating in the inference mode 860, a new dataset 871 is received at operation 861, such as in operation 603. The new dataset 871 corresponds a new browsing session generated by a first user. The first user may be a new user or any one of the one or more users corresponding to the historical browsing sessions 823. The new dataset 871 may include various information, including merchant browsing history, item browsing history, location of the first user or corresponding user device, etc. In some embodiments, training the neural network further includes inputting new datasets 871 received from current browsing sessions into the neural network to dynamically adjust the vector space with newly calculated weights. In some embodiments, the new dataset 871 includes a first merchant of the plurality of merchants. In some embodiments, the first merchant may be selected from a historical browsing session corresponding to the first user.

At operation 863, the first merchant in the new dataset is converted into a corresponding first merchant vector, such as with one-hot vectorization. The first merchant may correspond to a target merchant. The first merchant vector is input into the neural network at operation 865. Using the first merchant vector, the neural network may determine a plurality of associated merchants with corresponding vector representations that include a desired probability of association with the first merchant vector based on the weights. The associated merchants may be context merchants.

At operation 867, a second merchant from the plurality of merchants is selected based on the probability that the vector representation corresponding to the second merchant is associated with the vector representation corresponding to the first merchant. As described with reference to operation 607, the second merchant with the highest probability of similarity to the first merchant may be selected. In some embodiments, an associated context merchant with the highest probability is selected.

In some embodiments, the second merchant is selected based on having a corresponding vector representation with the highest cosine similarity score 873 with the first merchant vector. In some embodiments, a predetermined number 875 of merchants with corresponding vector representations having the highest cosine similarity scores 873 are selected and presented in the new browsing session.

As previously described, the vector representations may be grouped based on the geographic location 877 of the corresponding merchants in the historical datasets 821. The neural network may be trained with separate geographic groups such that associated merchants are only determined from a target merchant from the same geographic group 879. In other embodiments, the plurality of associated merchants determined at operation 865 are filtered to remove merchants not within the same geographic group 879 as the first merchant. Thus, the first merchant and the second merchant selected at operation 867 would be within the same geographic group 879.

At operation 869, the second merchant is transmitted to a first device corresponding to the first user. For example, the second merchant is presented in the new browsing session, as previously described with reference to operation 609, or in any subsequent browsing session. The selected second merchant may be transmitted to a customer device to be displayed, such as on user interface 300. In some embodiments, the second merchant is provided as suggested merchants to the customer. In some embodiments, the second merchant is provided as a search result for the entered search terms.

In other embodiments, the second merchant may be transmitted via an email, text message, or another messaging application on the customer device. In some embodiments, the second merchant may be transmitted in a push notification in an application on the customer device. Such transmission may be implemented by an associated customer preference recommendation system.

In some embodiments, user data of a customer using a user device to browse merchants and items may be used to determine associated merchants for suggestion. For example, at operation 881, user data corresponding to the first user is converted into a user vector representation. The user data may include a browsing history of the first user for a given time period range. User data associated with customers corresponding to historical browsing sessions may also be stored in the system. Customers may also be given a particular order and converted into corresponding user vectors based on the order.

In some embodiments, each user vector may be calculated as the aggregation of all merchant vectors the particular customer is associated with, such as merchants the customer has ordered from, or merchants the customer has explored in past browsing sessions.

At operation 883, the user vector representation is input into the neural network to generate a probability that the user vector representation is associated with each vector representation from the historical datasets 721. As such, the user vector may be positioned within the merchant vector space.

At operation 885, a third merchant may be selected from the plurality of merchants based on the probability that the vector representation corresponding to the third merchant is associated with the user vector representation. The third merchant may be an associated merchant with a corresponding vector representation having the highest cosine similarity score to the user vector.

In other example embodiments, the predictive merchant association model may function as a predictive item association model. In such predictive model, items that have been browsed or ordered by a customer during a browsing session may also be stored and vectorized. These item vectors may then be used to train a neural network to output context items based on target items received from a current browsing session. As such, items that are commonly browsed together among customers may be provided as targeted suggestions to a customer during a browsing session. For items, using data stored in historical browsing sessions, additional signals may be extracted from item descriptions using natural language techniques, such as bag of words or part of speech tagging. For example, nouns and adjectives may be extracted from item descriptions. This can be used to group items with similar names or descriptions together, or used as additional constraints for the predictive model.

For example, a first item and a second item may be grouped into an item group based on similarity of description of terms. Thus, a selection of the first item and a selection of second item by one or more customers may each count toward a selection of the item group. As another example, items may be arranged in a vector space based on the similarity of description terms. Thus, the first and second items may include a high probability of association based on their description terms.

Thus, associated items may be transmitted to the customer, such as at operation 869. In some embodiments, a second item may be recommended to the customer based on the selection of a first item or placement of an order for the first item by that customer. In some embodiments, the first item and the second item may be from the same merchant. In some embodiments, the first item and the second item may be from different merchants.

Figure 9:
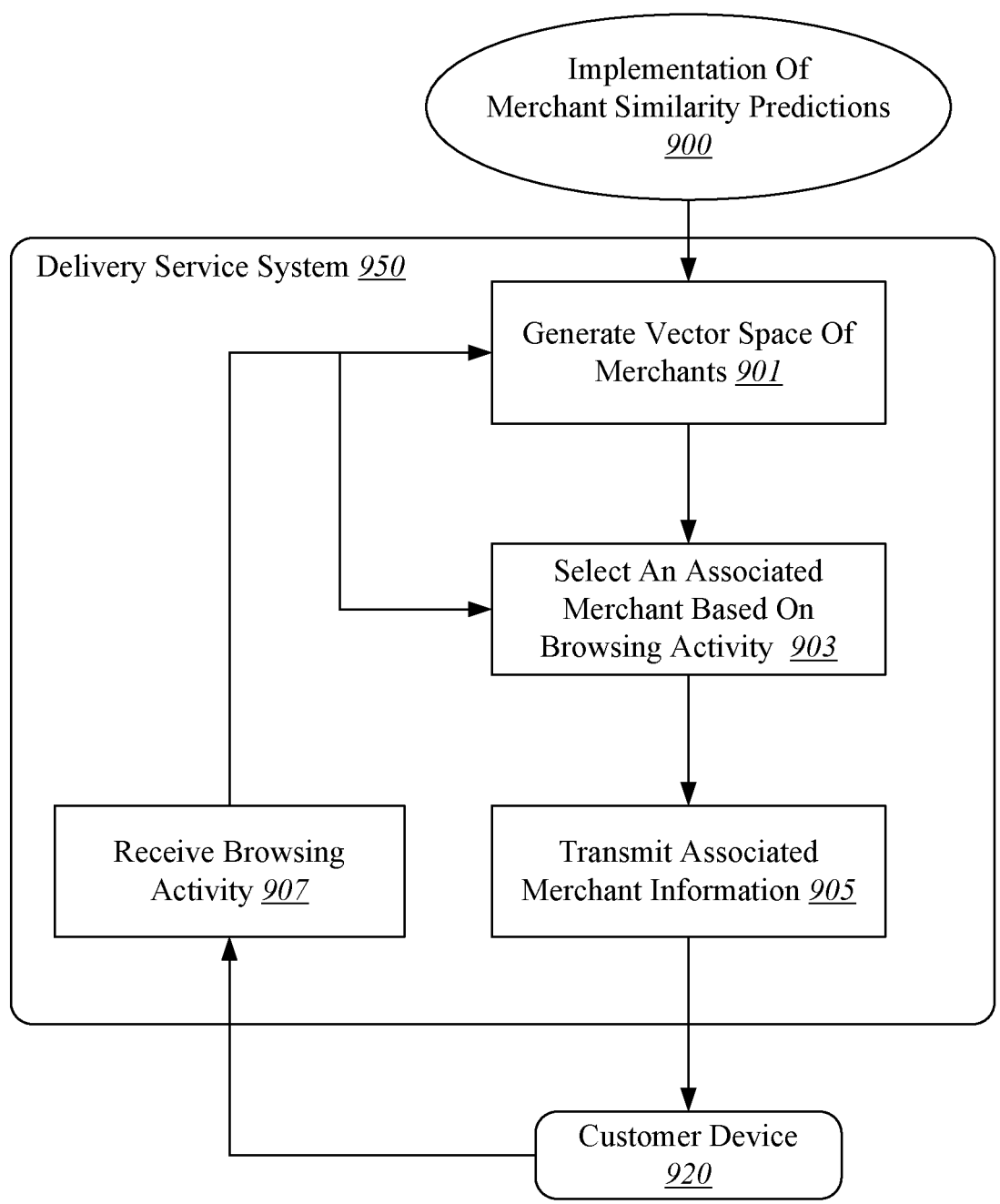
FIG. 9 illustrates an example flow process for implementation of merchant similarity predictions, in accordance with one or more embodiments.

FIG. 9 illustrates an example flow process 900 for implementation of merchant similarity predictions in a delivery platform system 950, in accordance with one or more embodiments. As previously described, the described systems may include a predictive merchant association model for generating dynamic similarity predictions for customers searching for merchants in a browsing session. At step 901, a vector space of merchants is generated, such as the matrices of neural network 700.

At step 907, browsing activity may be received at the delivery platform system 950 from customer device 920. Customer device 920 may be any one of various user devices 202-208 corresponding to a customer, such as device 320.

Once sufficiently trained, an associated merchant may be selected based on the data corresponding to browsing activity of a customer at step 903. For example, a merchant that is selected during the browsing session may be a target merchant and input into the predictive model as a vector. One or more vectors corresponding to context merchants may be output by the predictive model and selected as an associated merchant.

At step 905, the delivery platform system may transmit data corresponding to the selected associated merchant to the customer device 920. Additional browsing activity may be received at 907 to select additional associated merchants at 903. The additional browsing activity received at step 907 may also be used to update the vector space of merchants at 901.

Various computing devices can implement the methods described herein. For instance, a mobile device, computer system, etc. can be used to generate a weighted vector space of merchants and/or items for order. With reference to FIG. 10, shown is a particular example of a computer system 1000 that can be used to implement particular examples of the present disclosure. According to particular example embodiments, a system 1000 suitable for implementing particular embodiments of the present disclosure includes a processor 1001, a memory 1003, an interface 1011, and a bus 1015 (e.g., a PCI bus). When acting under the control of appropriate software or firmware, the processor 1001 is responsible for processing inputs through various computational layers and algorithms in a neural network. In some embodiments, the processor is responsible for updating the parameters of each computational layer using algorithms, including but not limited to, a stochastic gradient descent algorithm and a backpropagation algorithm. Various specially configured devices can also be used in place of a processor 1001 or in addition to processor 1001. The complete implementation can also be done in custom hardware.

The interface 1011 is typically configured to send and receive data packets or data segments over a network. Particular examples of interfaces the device supports include Ethernet interfaces, frame relay interfaces, cable interfaces, DSL interfaces, token ring interfaces, and the like. The interface 1011 may include separate input and output interfaces, or may be a unified interface supporting both operations. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1000 uses memory 1003 to store data and program instructions for operations including training a neural network and generating merchant similarity predictions, such as in methods 600 and 800. The program instructions may control the operation of an operating system and/or one or more applications, for example. The memory or memories may also be configured to store received metadata and batch requested metadata. The memory or memories may also be configured to store data corresponding to parameters and weighted factors.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A server system comprising:
a memory; and
one or more processors, the processors configurable to cause:
training a neural network using a first training dataset such that a weighted vector space of a plurality of merchants is generated, the weighted vector space having a set of weights, each weight corresponding to one of a plurality of vector dimensions, the plurality of vector dimensions corresponding to a plurality of merchant features, wherein the neural network is trained by:
(i) inputting the first training dataset into an input layer of the neural network to generate the set of weights corresponding to the plurality of vector dimensions, the first training dataset including first groupings of merchant vectors having the plurality of vector dimensions, each merchant vector of the first groupings including a vector representation corresponding to one of the plurality of merchants, the first training set corresponding to at least one browsing session generated at one or more client devices, wherein each first grouping of merchant vectors corresponds to a plurality of context-target merchant pairs, each context-target merchant pair being associated with a context merchant and a target merchant,
(ii) for each first grouping, generating, using the corresponding plurality of context-target merchant pairs and at least one glossary of merchant vectors that maps each of the plurality of merchants to a corresponding one of a plurality of merchant vectors, for each context merchant of the first grouping, probability values for the plurality of merchants, each of the probability values characterizing an association between the merchant vector corresponding to the context merchant of the first grouping and the merchant vector corresponding one of the plurality of merchants, and
(iii) updating the weighted vector space using the probability values generated for each first grouping via backpropagation of associated errors,
inputting a first merchant vector of a new dataset into the input layer of the neural network, the first merchant vector being associated with a first merchant and having the plurality of vector dimensions, the new data set corresponding to a new browsing session generated at a first client device;
outputting, via an output layer of the neural network using the weighted vector space of the neural network, a set of merchants with corresponding merchant vectors having at least a threshold probability of association with the first merchant vector;
selecting a second merchant from the set of merchants based on a corresponding probability value generated using the weighted vector space, the probability value characterizing an association between the first merchant vector and a second merchant vector corresponding to the second merchant;
transmitting a first message to the first client device, wherein the first message identifies the second merchant;
generating a second training dataset, wherein the second training dataset represents user selection of one or more merchants in response to the first message, wherein the second training dataset includes second groupings of merchant vectors, wherein each second grouping of merchant vectors corresponds to at least one searched merchant and a selected merchant; and
training the neural network by updating the weighted vector space using the second training dataset by: performing backpropagation of errors associated with probability values generated based, at least in part, on the merchant vector corresponding to the selected merchant of the second grouping and merchant vectors corresponding to the at least one searched merchant of the second grouping.

2. The server system of claim 1, wherein:
the neural network is trained using skip-gram modelling of the merchant vectors of the first groupings.

3. The server system of claim 1, the processors is further configurable to cause:
converting user data corresponding to a first user into a user vector, the first user being associated with the first client device;
inputting the user vector into the neural network to generate a probability that the user vector is associated with merchant vectors of the plurality of merchants; and
transmitting a second message to the first client device, wherein the second message pertains to a third merchant, wherein the third merchant is selected from the plurality of merchants based on the probability that the vector representation corresponding to the third merchant is associated with the user vector.

4. The server system of claim 1, wherein the first training dataset includes a predetermined number of merchant vectors.

5. The server system of claim 1, wherein the second merchant is selected from the plurality of associated merchants based on having a corresponding vector representation with a highest cosine similarity score with the first merchant vector.

6. The server system of claim 5, wherein a predetermined number of merchants having corresponding vector representations with highest cosine similarity scores are selected from the plurality of associated merchants and presented in the new browsing session.

7. The server system of claim 1,
wherein the merchant vectors in the first groupings are grouped based on geographic locations of the corresponding merchants, and
wherein the first merchant and the second merchant are within a same geographic group.

8. A programmable device configured for:
training a neural network using a first training dataset such that a weighted vector space of a plurality of merchants is generated, the weighted vector space having a set of weights, each weight corresponding to one of a plurality of vector dimensions, the plurality of vector dimensions corresponding to a plurality of merchant features, wherein the neural network is trained by:
(i) inputting the first training dataset into an input layer of the neural network to generate the set of weights corresponding to the plurality of vector dimensions, the first training dataset including first groupings of merchant vectors having the plurality of vector dimensions, each merchant vector of the first groupings including a vector representation corresponding to one of the plurality of merchants, the first training set corresponding to at least one browsing session generated at one or more client devices, wherein each first grouping of merchant vectors corresponds to a plurality of context-target merchant pairs, each context-target merchant pair being associated with a context merchant and a target merchant,
(ii) for each first grouping, generating, using the corresponding plurality of context-target merchant pairs and at least one glossary of merchant vectors that maps each of the plurality of merchants to a corresponding one of a plurality of merchant vectors, for each context merchant of the first grouping, probability values for the plurality of merchants, each of the probability values characterizing an association between the merchant vector corresponding to the context merchant of the first grouping and the merchant vector corresponding one of the plurality of merchants, and
(iii) updating the weighted vector space using the probability values generated for each first grouping via backpropagation of associated errors,
inputting a first merchant vector of a new dataset into the input layer of the neural network, the first merchant vector being associated with a first merchant and having the plurality of vector dimensions, the new data set corresponding to a new browsing session generated at a first client device;
outputting, via an output layer of the neural network using the weighted vector space of the neural network, a set of merchants with corresponding merchant vectors having at least a threshold probability of association with the first merchant vector;
selecting a second merchant from the set of merchants based on a corresponding probability value generated using the weighted vector space, the probability value characterizing an association between the first merchant vector and a second merchant vector corresponding to the second merchant;
transmitting a first message to the first client device, wherein the first message identifies the second merchant;
generating a second training dataset, wherein the second training dataset represents user selection of one or more merchants in response to the first message, wherein the second training dataset includes second groupings of merchant vectors, wherein each second grouping of merchant vectors corresponds to at least one searched merchant and a selected merchant; and
training the neural network by updating the weighted vector space using the second training dataset by: performing backpropagation of errors associated with probability values generated based, at least in part, on the merchant vector corresponding to the selected merchant of the second grouping and merchant vectors corresponding to the at least one searched merchant of the second grouping.

9. The programmable device of claim 8, wherein:
the neural network is trained using skip-gram modelling of the merchant vectors of the first groupings.

10. The programmable device of claim 8, further being configured for:
converting user data corresponding to a first user into a user vector, the first user being associated with the first client device;
inputting the user vector into the neural network to generate a probability that the user vector is associated with merchant vectors of the plurality of merchants; and
transmitting a second message to the first client device, wherein the second message pertains to a third merchant, wherein the third merchant is selected from the plurality of merchants based on the probability that the vector representation corresponding to the third merchant is associated with the user vector.

11. The programmable device of claim 8, wherein the first training dataset includes a predetermined number of merchant vectors.

12. The programmable device of claim 8, wherein the second merchant is selected from the plurality of associated merchants based on having a corresponding vector representation with a highest cosine similarity score with the first merchant vector.

13. The programmable device of claim 12, wherein a predetermined number of merchants having corresponding vector representations with highest cosine similarity scores are selected from the plurality of associated merchants and presented in the new browsing session.

14. The programmable device of claim 8,
wherein the merchant vectors in the first groupings are grouped based on geographic locations of the corresponding merchants, and
wherein the first merchant and the second merchant are within a same geographic group.

15. A method, comprising:
training a neural network using a first training dataset such that a weighted vector space of a plurality of merchants is generated, the weighted vector space having a set of weights, each weight corresponding to one of a plurality of vector dimensions, the plurality of vector dimensions corresponding to a plurality of merchant features, wherein the neural network is trained by:
(i) inputting the first training dataset into an input layer of the neural network to generate the set of weights corresponding to the plurality of vector dimensions, the first training dataset including first groupings of merchant vectors having the plurality of vector dimensions, each merchant vector of the first groupings including a vector representation corresponding to one of the plurality of merchants, the first training set corresponding to at least one browsing session generated at one or more client devices, wherein each first grouping of merchant vectors corresponds to a plurality of context-target merchant pairs, each context-target merchant pair being associated with a context merchant and a target merchant,
(ii) for each first grouping, generating, using the corresponding plurality of context-target merchant pairs and at least one glossary of merchant vectors that maps each of the plurality of merchants to a corresponding one of a plurality of merchant vectors, for each context merchant of the first grouping, probability values for the plurality of merchants, each of the probability values characterizing an association between the merchant vector corresponding to the context merchant of the first grouping and the merchant vector corresponding one of the plurality of merchants, and
(iii) updating the weighted vector space using the probability values generated for each first grouping via backpropagation of associated errors,
inputting a first merchant vector of a new dataset into the input layer of the neural network, the first merchant vector being associated with a first merchant and having the plurality of vector dimensions, the new data set corresponding to a new browsing session generated at a first client device;
outputting, via an output layer of the neural network using the weighted vector space of the neural network, a set of merchants with corresponding merchant vectors having at least a threshold probability of association with the first merchant vector;
selecting a second merchant from the set of merchants based on a corresponding probability value generated using the weighted vector space, the probability value characterizing an association between the first merchant vector and a second merchant vector corresponding to the second merchant;
transmitting a first message to the first client device, wherein the first message identifies the second merchant;
generating a second training dataset, wherein the second training dataset represents user selection of one or more merchants in response to the first message, wherein the second training dataset includes second groupings of merchant vectors, wherein each second grouping of merchant vectors corresponds to at least one searched merchant and a selected merchant; and
training the neural network by updating the weighted vector space using the second training dataset by: performing backpropagation of errors associated with probability values generated based, at least in part, on the merchant vector corresponding to the selected merchant of the second grouping and merchant vectors corresponding to the at least one searched merchant of the second grouping.

16. The method of claim 15, wherein:
the neural network is trained using skip-gram modelling of the merchant vectors of the first groupings.

17. The method of claim 15, further comprising:
converting user data corresponding to a first user into a user vector, the first user being associated with the first client device;
inputting the user vector into the neural network to generate a probability that the user vector is associated with merchant vectors of the plurality of merchants; and
transmitting a second message to the first client device, wherein the second message pertains to a third merchant, wherein the third merchant is selected from the plurality of merchants based on the probability that the vector representation corresponding to the third merchant is associated with the user vector.

18. The method of claim 15, wherein the first training dataset includes a predetermined umber of merchant vectors.

19. The method of claim 15, wherein the second merchant is selected from the plurality of associated merchants based on having a corresponding vector representation with a highest cosine similarity score with the first merchant vector.

20. The method of claim 19, wherein a predetermined number of merchants having corresponding vector representations with highest cosine similarity scores are selected from the plurality of associated merchants and presented in the new browsing session.

* * * * *